US008977186B2

(12) United States Patent
Fukada

(10) Patent No.: US 8,977,186 B2
(45) Date of Patent: Mar. 10, 2015

(54) DRIVE TRANSMISSION SYSTEM, POST-PROCESSING DEVICE, AND IMAGE FORMING APPARATUS

(75) Inventor: Satoshi Fukada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 351 days.

(21) Appl. No.: 13/492,141

(22) Filed: Jun. 8, 2012

(65) Prior Publication Data

US 2013/0142557 A1 Jun. 6, 2013

(30) Foreign Application Priority Data

Dec. 1, 2011 (JP) ................................ 2011-263253

(51) Int. Cl.
*G03G 15/00* (2006.01)
*H02P 8/00* (2006.01)

(52) U.S. Cl.
USPC .......................................... 399/407; 318/696

(58) Field of Classification Search
CPC .......... G03G 15/00; H01L 41/00; H02P 8/00; H02P 8/22
USPC ............... 399/407-410; 310/316.01; 318/696
See application file for complete search history.

(56) References Cited

U.S. PATENT DOCUMENTS 4,567,418 A * 1/1986 Takemoto et al. ............ 318/685
5,572,105 A * 11/1996 Nojima et al. ................ 318/696
2006/0072948 A1* 4/2006 Miyake et al. ................ 399/361
2007/0247023 A1* 10/2007 Tanimura ................. 310/316.01

FOREIGN PATENT DOCUMENTS

JP 04026395 A * 1/1992 ............ G03G 15/00
JP 05-127441 A 5/1993
JP 05270692 A * 10/1993 ............ G03G 15/00
JP 05-323684 A 12/1993
JP 07-300270 A 11/1995
JP 2000-310893 A 11/2000
JP 2003-089463 A 3/2003
JP 2006-069727 A 3/2006
JP 2006-069746 A 3/2006
JP 2006-069749 A 3/2006
JP 2007-003964 A 1/2007
JP 2007003964 A * 1/2007 ............ G03G 15/00
JP 2010169946 A * 8/2010 ............ G03G 15/00
JP 2011-088682 A 5/2011
JP 2011-088683 A 5/2011

* cited by examiner

*Primary Examiner* — Nguyen Ha
(74) *Attorney, Agent, or Firm* — Sughrue Mion, PLLC

(57) ABSTRACT

A drive transmission system includes a drive source and a gear. The drive source includes a rotating shaft, a magnet supported by the rotating shaft, and plural electromagnets. The plural electromagnets are arranged in a circumferential direction of the rotating shaft, and surround the magnet. The drive source drives the rotating shaft to rotate by a predetermined rotation angle by exciting at least one of the plural electromagnets in accordance with an input of an input signal and by periodically changing a magnetic pole to which each of the plural electromagnets is excited in response to an input of the input signal. The gear is supported by the rotating shaft.

5 Claims, 16 Drawing Sheets

DRIVE TRANSMISSION SYSTEM, POST-PROCESSING DEVICE, AND IMAGE FORMING APPARATUS

CROSS-REFERENCE TO RELATED APPLICATIONS

This application is based on and claims priority under 35 USC 119 from Japanese Patent Application No. 2011-263253 filed Dec. 1, 2011.

BACKGROUND

Technical Field

The present invention relates to a drive transmission system, a post-processing device, and an image forming apparatus.

SUMMARY

According to an aspect of the invention, there is provided a drive transmission system circuit including a drive source and a gear. The drive source includes a rotating shaft, a magnet supported by the rotating shaft, and plural electromagnets. The plural electromagnets are arranged in a circumferential direction of the rotating shaft, and surround the magnet. The drive source drives the rotating shaft to rotate by a predetermined rotation angle by exciting at least one of the plural electromagnets in accordance with an input of an input signal and by periodically changing a magnetic pole to which each of the plural electromagnets is excited in response to an input of the input signal. The gear is supported by the rotating shaft. The least common multiple of a second frequency and a third frequency exceeds a threshold value that is a predetermined value based on an audible frequency range audible to the human ear. In this case, the second frequency is a value obtained by multiplying the number of rotations of the drive source per unit time by the number of teeth of the gear. The number of rotations of the drive source per unit time is a value obtained by dividing a first frequency by a total number of input signals required for the rotating shaft to rotate one turn. The first frequency is a value representing the number of input signals input to the drive source per unit time. Further, the third frequency is a value obtained by dividing the first frequency by the number of steps per cycle. The number of steps per cycle is a total number of input signals required for the periodically changing of the magnetic pole to complete one cycle.

BRIEF DESCRIPTION OF THE DRAWINGS

An exemplary embodiment of the present invention will be described in detail based on the following figures, wherein:

FIGS. 9A and 9B illustrate a drive transmission system according to the first exemplary embodiment, in which FIG. 9A illustrates a substantial part of the drive transmission system when the post-processing device is viewed from rear to front, and FIG. 9B illustrates a substantial part of a stacker exit motor, a gear, and a timing belt according to the first exemplary embodiment;

FIGS. 10A to 10D illustrate a stacker exit motor according to the first exemplary embodiment, in which FIG. 10A is a cross-sectional view of a motor body, FIG. 10B is an enlarged perspective view of the teeth of rotors, FIG. 10C is a cross-sectional view taken along line XC-XC in FIG. 10A, and FIG. 10D illustrates a substantial part of a stator unit in which coils and a power supply are removed from the configuration illustrated in FIG. 10C;

FIGS. 11A to 11C illustrate relationships between rotor teeth and stator teeth when the right direction is the rotation direction, in which FIG. 11A illustrates a relationship between the rotor teeth and the stator teeth when only the $A_+$ phase coils are energized, FIG. 11B illustrates a relationship between the rotor teeth and the stator teeth when the energization of the $A_+$ phase coils is disconnected after the state illustrated in FIG. 11A and the $B_+$ phase coils are energized, and FIG. 11C illustrates a relationship between the rotor teeth and the stator teeth when the $B_+$ phase coils are energized after the state illustrated in FIG. 11A;

DETAILED DESCRIPTION

Figure 1:
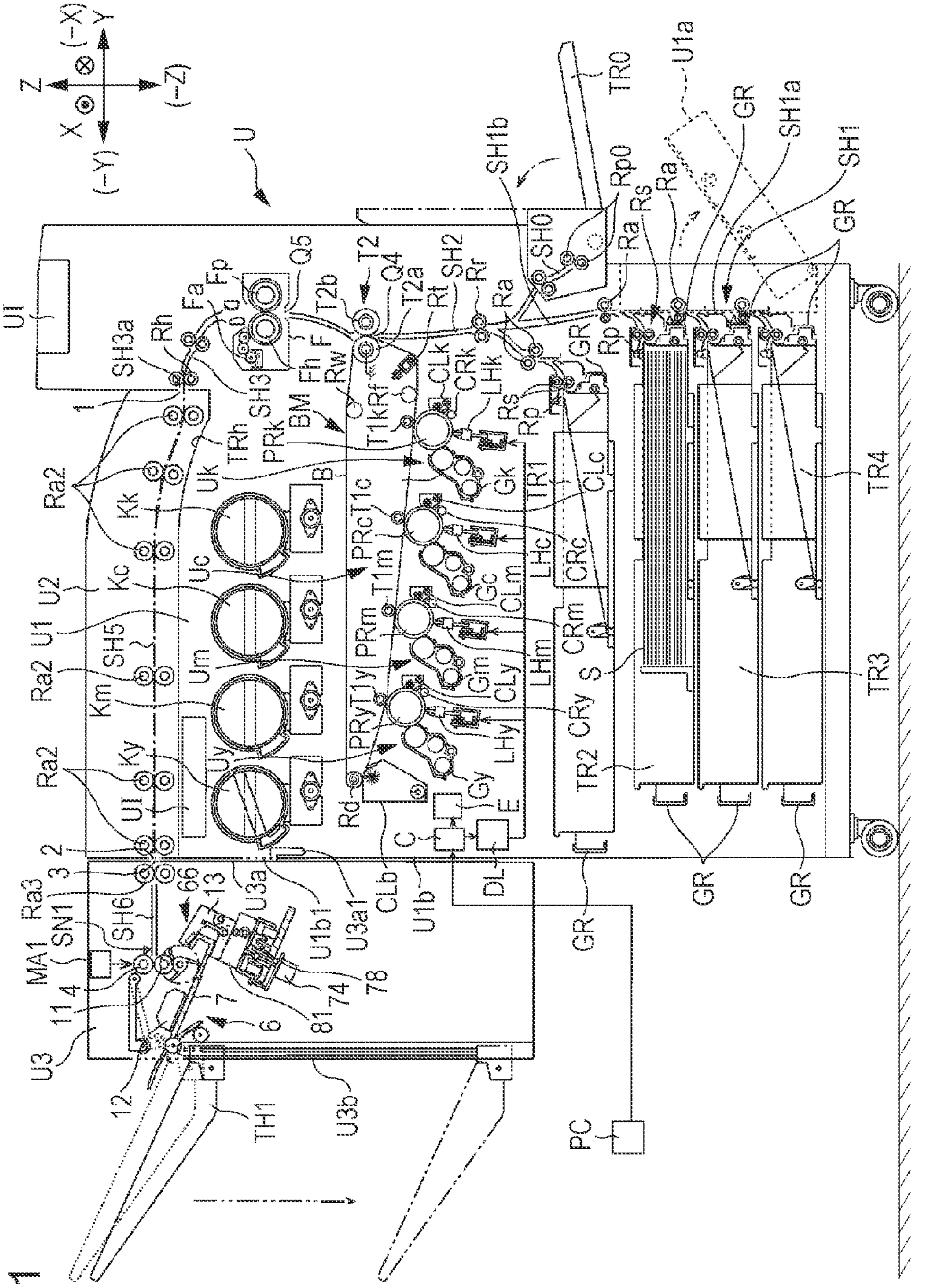
FIG. 1 illustrates an overall view of an image forming apparatus according to a first exemplary embodiment.

A specific example of an exemplary embodiment of the present invention (hereinafter referred to as an "exemplary embodiment") will be described hereinafter with reference to the drawings. It is to be understood that the present invention is not limited to the following exemplary embodiment.

For ease of understanding of the following description, in the drawings, the front-rear direction is defined as an X-axis direction, the left-right direction as a Y-axis direction, and the up-down direction as a Z-axis direction. Also, directions indicated by arrows X, −X, Y, −Y, Z, and −Z are defined as "forward", "rearward", "rightward", "leftward", "upward", and "downward", respectively. In addition, sides indicated by arrows X, −X, Y, −Y, Z, and −Z are defined as "front" or "front side", "rear" or "rear side", "right" or "right side", "left" or "left side", "upper" or "upper side", and "lower" or "lower side", respectively.

Further, in the drawings, a dot in a circle represents an arrow pointing from the back to the front of the paper, and a cross in a circle represents an arrow pointing from the front to the back of the paper.

In the following description taken in conjunction with the drawings, illustration of members other than those necessary for the description is properly omitted for ease of understanding.

First Exemplary Embodiment

FIG. 1 illustrates the overall structure of an image forming apparatus according to a first exemplary embodiment.

In FIG. 1, a printer U, which may be an example of the image forming apparatus according to the first exemplary embodiment of the present invention, includes a printer body U1, which may be an example of a body of the image forming apparatus. Image information transmitted from an information processing device PC electrically connected to the printer U, which may be an example of an image information transmitting device, is input to a controller C. The image information input to the controller C is converted at a predetermined timing into image information on yellow (Y), magenta (M), cyan (C), and black (K) for forming latent images, and is output to a latent image forming circuit DL.

If a document image is a single-color image, or monochrome image, the image information on only black (K) is input to the latent image forming circuit DL.

The latent image forming circuit DL includes drive circuits (not illustrated) for the respective colors of Y, M, C, and K, and outputs signals corresponding to the input image information to latent image forming devices LHy, LHm, LHc, and LHk disposed for the respective colors at a predetermined timing.

Figure 2:
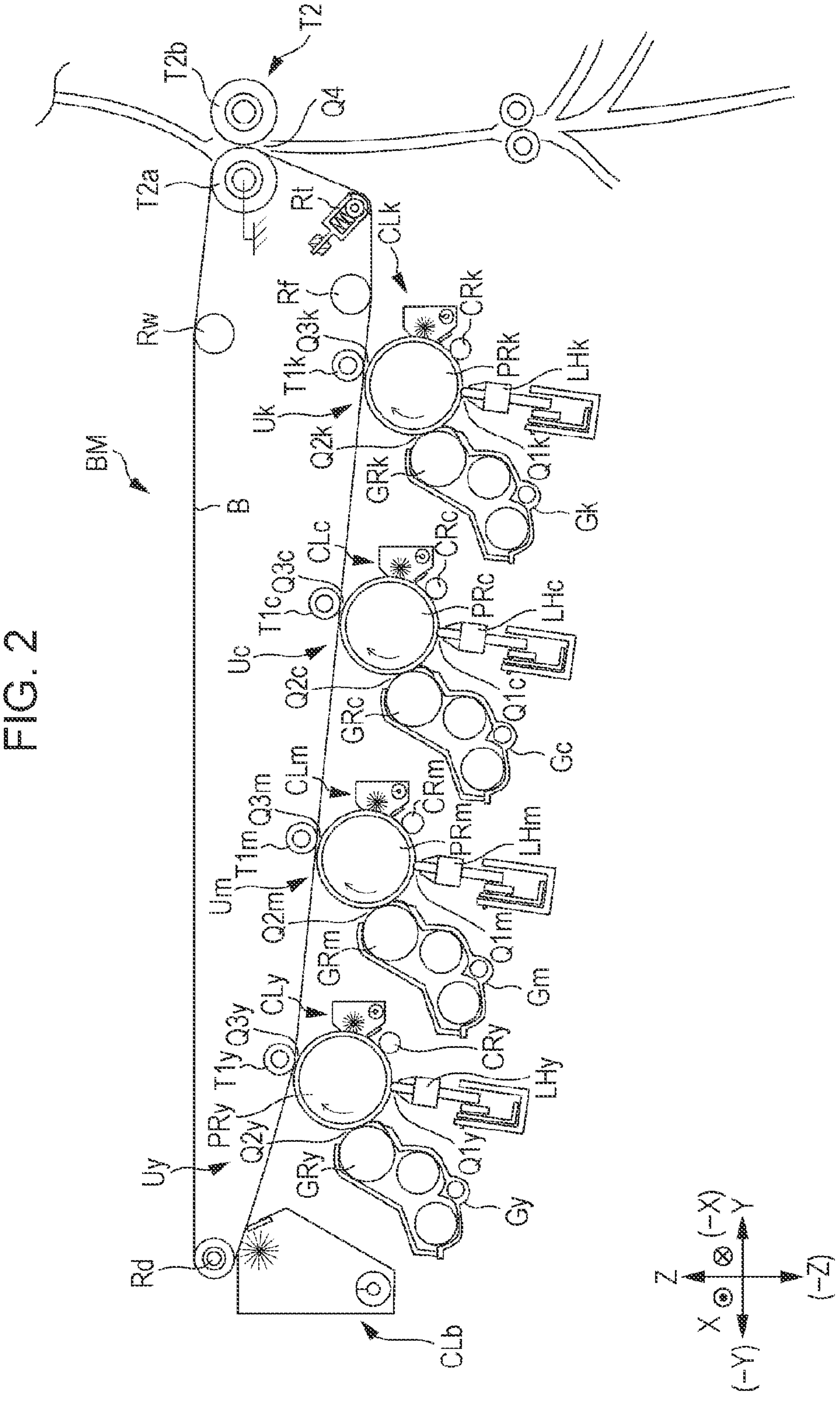
FIG. 2 is an enlarged view of a substantial part of the image forming apparatus according to the first exemplary embodiment.

FIG. 2 is an enlarged view of a substantial part of the image forming apparatus according to the first exemplary embodiment.

In FIGS. 1 and 2, the latent image writing light beams of the respective colors of Y, M, C, and K, which are emitted from latent image writing light sources of the latent image forming devices LHy, LHm, LHc, and LHk, enter rotating photoconductors PRy, PRm, PRc, and PRk, respectively. The rotating photoconductors PRy, PRm, PRc, and PRk may be examples of image holding members. In the first exemplary embodiment, each of the latent image forming devices LHy to LHk may be a light emitting diode (LED) array having LEDs arranged linearly along the width of an image. The LEDs may be examples of light emitting elements.

Around the photoconductors PRy, PRm, PRc, and PRk, chargers CRy, CRm, CRc, and CRk, the latent image forming devices LHy, LHm, LHc, and LHk, developing devices Gy, Gm, Gc, and Gk, first transfer devices T1*y*, T1*m*, T1*c*, and T1*k*, and photoconductor cleaners CLy, CLm, CLc, and CLk, which may be examples of cleaning devices, are disposed in the direction of rotation of the photoconductors PRy, PRm, PRc, and PRk.

In FIGS. 1 and 2, the photoconductors PRy, PRm, PRc, and PRk are charged by the chargers CRy, CRm, CRc, and CRk, respectively, and then electrostatic latent images are formed on the surfaces of the photoconductors PRy, PRm, PRc, and PRk at image writing positions Q1*y*, Q1*m*, Q1*c*, and Q1*k*, respectively, by the respective latent image writing light beams. The electrostatic latent images on the surfaces of the photoconductors PRy, PRm, PRc, and PRk are developed into toner images in developing regions Q2*y*, Q2*m*, Q2*c*, and Q2*k* by developers held on developing rollers GRy, GRm, GRc, and GRk of developing devices Gy, Gm, Gc, and Gk, respectively. The toner images may be examples of visible images, and the developing rollers GRy, GRm, GRc, and GRk may be examples of developer holding members.

The developed toner images are transported to first transfer regions Q3*y*, Q3*m*, Q3*c*, and Q3*k* that are in contact with an intermediate transfer belt B. The intermediate transfer belt B may be an example of an intermediate transfer body. In the first transfer regions Q3*y* to Q3*k*, a first-transfer voltage having a polarity opposite to the polarity of the electric charge of toner is applied to the first transfer devices T1*y* to T1*k* disposed on the back side of the intermediate transfer belt B at a predetermined timing from a power supply circuit E controlled by the controller C.

The toner images on the photoconductors PRy to PRk are transferred (first transfer) onto the intermediate transfer belt B by the first transfer devices T1*y* to T1*k*, respectively. The residues and debris on the surfaces of the photoconductors PRy to PRk after the first transfer has been completed are cleaned by the photoconductor cleaners CLy to CLk, respectively. The cleaned surfaces of the photoconductors PRy to PRk are recharged by the chargers CRy to CRk, respectively.

A visible image forming device Uy of the color of Y according to the first exemplary embodiment that forms a toner image, which may be an example of a visible image, includes the photoconductor PRy, the charger CRy, the latent image forming device LHy, the developing device Gy, the first transfer device T1*y*, and the photoconductor cleaner CLy of the color of Y. Similarly, visible image forming devices Um, Uc, and Uk of the colors of M, C, and K include the photoconductors PRm, PRc, and PRk, the chargers CRm, CRc, and CRk, the latent image forming devices LHm, LHc, and LHk, the developing devices Gm, Gc, and Gk, the first transfer devices T1*m*, T1*c*, and T1*k*, and the photoconductor cleaners CLm, CLc, and CLk, respectively.

A belt module BM capable of moving up and down and being pulled out forward is disposed above the photoconductors PRy to PRk. The belt module BM may be an example of an intermediate transfer device. The belt module BM includes the intermediate transfer belt B, a belt drive roller Rd, a tension roller Rt, a walking roller Rw, an idler roller Rf, a backup roller T2*a*, and the first transfer devices T1*y* to T1*k*. The belt drive roller Rd may be an example of a drive member, the tension roller Rt may be an example of a stretching member, and the walking roller Rw may be an example of a meandering prevention member. The idler roller Rf may be an example of a driven member, and the backup roller T2*a* may be an example of a second-transfer opposite member. The intermediate transfer belt B is supported by the rollers Rd, Rt, Rw, Rf, and T2*a* so as to be rotatably movable.

A second transfer roller T2*b*, which may be an example of a second transfer member, is disposed at a position opposite the backup roller T2*a* with the intermediate transfer belt B interposed between the backup roller T2*a* and the second transfer roller T2*b*. A second transfer device T2 according to the first exemplary embodiment includes the backup roller T2*a* and the second transfer roller T2*b*. Further, a second transfer region Q4 is a region where the second transfer roller T2*b* and the intermediate transfer belt B are in contact with each other.

A single-color toner image or multiple-color toner images that are sequentially transferred so as to be superimposed on top of one another, which are transferred onto the intermediate transfer belt B in the first transfer regions Q3*y* to Q3*k* by the first transfer devices T1*y* to T1*k*, are transported to the second transfer region Q4.

The first transfer devices T1*y* to T1*k*, the intermediate transfer belt B, the second transfer device T2, etc., constitute a transfer device (T1+T2+B) according to the first exemplary embodiment. Further, the visible image forming devices Uy to Uk and the transfer device (T1+T2+B) constitute an image recording unit (Uy to Uk+T1+T2+B) according to the first exemplary embodiment.

In FIG. 1, four pairs of right and left guide rails GR are provided downward from the visible image forming devices Uy to Uk, and paper feed trays TR1 to TR4 are supported by the pairs of guide rails GR so as to be insertable into and removable from the printer body U1 in the front-rear direction. The guide rails GR may be examples of guide members, and the paper feed trays TR1 to TR4 may be examples of paper feed containers. Sheets S received in the paper feed trays TR1 to TR4, which may be examples of media, are picked up by pickup rollers Rp, and are separated one by one by pairs of separation rollers Rs. The pickup rollers Rp may be examples of a transport member and examples of pickup members, and the pairs of separation rollers Rs may be examples of separation members. A sheet S is transported along a paper feed path SH1 by plural pairs of transport rollers Ra, and is fed to a pair of registration rollers Rr disposed upstream of the second transfer region Q4 in a sheet transport direction. The paper feed path SH1 may be an example of a media transport path, the pairs of transport rollers Ra may be examples of a transport member, and the pair of registration rollers Rr may be an example of a member for adjusting the timing at which a medium is to be transported.

The pickup rollers Rp, the separation rollers Rs, etc., constitute a paper feeding device (Rp+Rs) according to the first exemplary embodiment.

A manual feed tray TR0, which may be an example of a manual paper feeding unit, is disposed rightward of the top paper feed tray TR1. A sheet S supported by the manual feed tray TR0 is fed by a pair of manual paper feed rollers Rp0, which may be an example of a manual paper feeding member, and is transported along a manual feed transport path SH0 to the pair of registration rollers Rr.

The pair of registration rollers Rr transports the sheet S to a principal transport path SH2, which may be an example of a transport path, downstream of the paper feed path SH1 in synchronization with the transporting of the toner image or images formed on the intermediate transfer belt B to the second transfer region Q4, and transports the sheet S to the second transfer region Q4. When the sheet S passes the second transfer region Q4, the backup roller T2*a* is grounded, and a second-transfer voltage having a polarity opposite to the polarity of the electric charge of toner is applied to the second transfer device T2*b* from the power supply circuit E controlled by the controller C. The toner image or images on the intermediate transfer belt B are transferred onto the sheet S from the intermediate transfer belt B.

After the second transfer has been completed, the intermediate transfer belt B is cleaned by a belt cleaner CLb, which may be an example of an intermediate transfer body cleaning device.

The sheet S onto which the toner image or images have been transferred (second transfer) is transported to a fixing region Q5 that is a region where a heating roller Fh and a pressure roller Fp are in contact with each other, and is heated and fixed when passing the fixing region Q5. The heating roller Fh and the pressure roller Fp may be an example of a heat fixing member and a pressure fixing member of a fixing device F, respectively. A release agent is applied to the surface of the heating roller Fh by a release agent applying device Fa in order to help the sheet S release from the heating roller Fh.

A paper output path SH3, which may be an example of a transport path, along which the sheet S is transported toward a paper output tray TRh is disposed upward, or downstream of the fixing device F in the transport direction. The paper output tray TRh may be an example of a unit in which media output from the printer body U1 are stacked. Therefore, in a case where the sheet S is transported toward the paper output tray TRh, the sheet S onto which the toner image or images have been fixed is transported along the paper output path SH3, and is output from a sheet output port SH3*a* by a pair of paper output rollers Rh. The sheet output port SH3*a* may be an example of a media output port, and the pair of paper output rollers Rh may be an example of an exiting member of the printer body U1.

In FIG. 1, in the first exemplary embodiment, a lower cover U1*a*, which may be an example of an upstream-side opening member, is supported at a position to the right of the three lower paper feed trays TR2 to TR4 so as to be openable and closable between a normal position indicated by a solid line in FIG. 1 and an open position indicated by a broken line in FIG. 1. The right guide of the paper feed path SH1 disposed on the right side of the paper feed trays TR2 to TR4, and the outer rollers of the respective pairs of transport rollers Ra are supported by the lower cover U1*a*. Therefore, moving the lower cover U1*a* to the open position allows a lower portion of the paper feed path SH1, that is, an upstream-side paper feed path SH1*a* that is located on the upstream side of the paper feed path SH1 in the transport direction, to be made open to remove jammed media.

The transport paths SH0 to SH3 constitute a transport path SH according to the first exemplary embodiment. Further, the transport path SH, the paper feeding device (Rp+Rs), the sheet transport rollers Ra, the registration rollers Rr, the paper output rollers Rh, etc., constitute a media transport system (SH+Ra to Rh).

Sheet Transport Unit U2 in First Exemplary Embodiment

In FIG. 1, the printer U according to the first exemplary embodiment includes a sheet transport unit U2 that is removably attached to the paper output tray TRh. The sheet transport unit U2 may be an example of a media transport unit. The sheet transport unit U2 has a side surface to be connected to the sheet output port SH3*a* in the printer body U1, and an input port 1 through which the sheet S output from the pair of paper output rollers Rh enters is formed in the side surface. The sheet S that has entered through the input port 1 is transported along a communicating transport path SH5 through pairs of communicating transport rollers Ra2 disposed in the sheet transport unit U2. The communicating transport path SH5 may be an example of a transport path, and the pairs of communicating transport rollers Ra2 may be examples of a transport member. The sheet S transported along the communicating transport path SH5 is output from an output port 2 that is formed in another side surface of the sheet transport unit U2 and that is directed toward the post-processing device U3.

Post-Processing Device U3 in First Exemplary Embodiment

Figure 3:
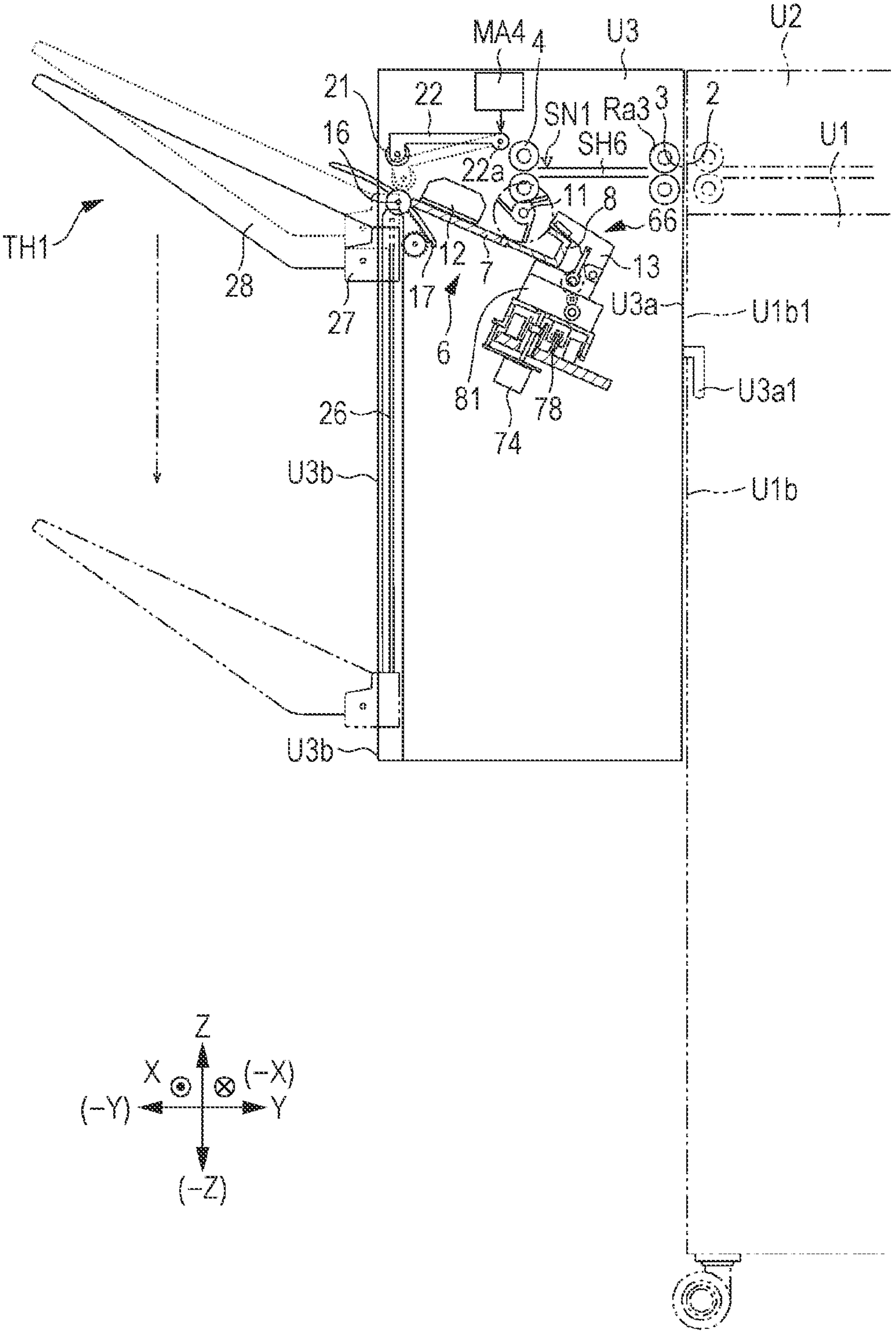
FIG. 3 is an enlarged view of a post-processing device according to the first exemplary embodiment, and illustrates the upward and downward movement of a clamp roller used for exit.

FIG. 3 is an enlarged view of a post-processing device U3 according to the first exemplary embodiment, and illustrates the upward and downward movement of a clamp roller 21 used for exit.

Figure 4:
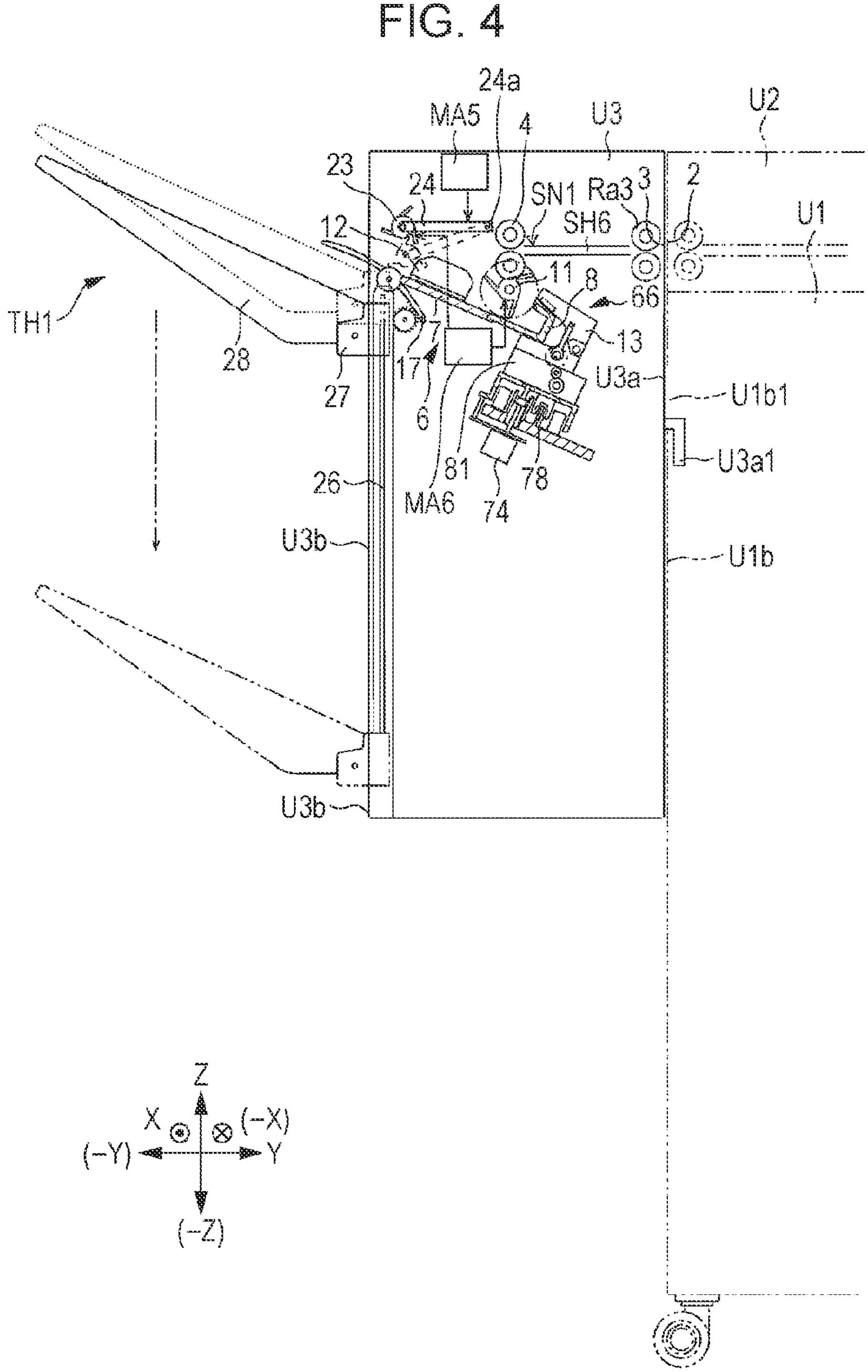
FIG. 4 is an enlarged view of the post-processing device according to the first exemplary embodiment, and illustrates the upward and downward movement of a sub-paddle.

FIG. 4 is an enlarged view of the post-processing device U3 according to the first exemplary embodiment, and illustrates the upward and downward movement of sub-paddles 23.

Figure 5:
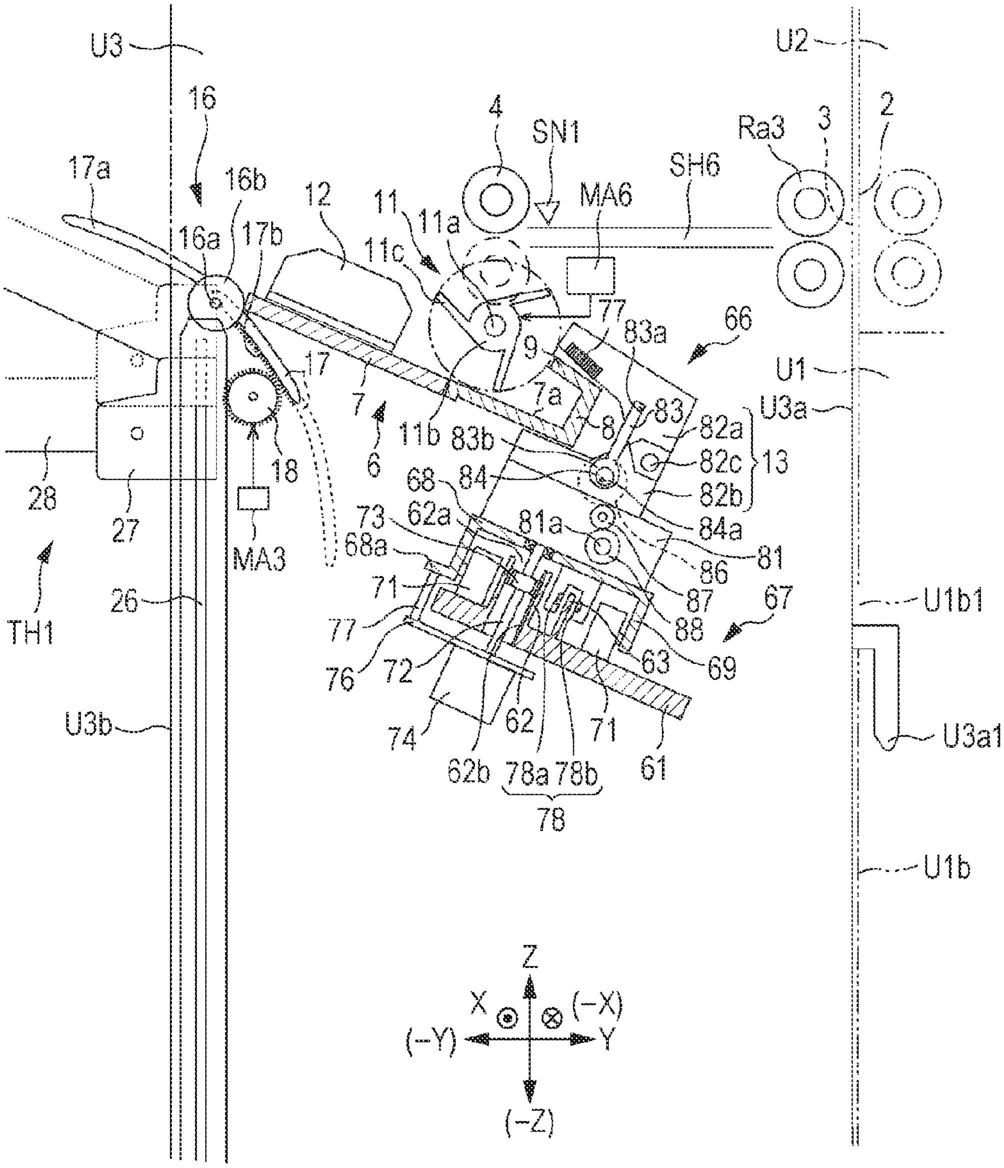
FIG. 5 is an enlarged view of a substantial part of the post-processing device according to the first exemplary embodiment.

FIG. 5 is an enlarged view of a substantial part of the post-processing device U3 according to the first exemplary embodiment.

In FIGS. 1, 3, and 4, the printer U according to the first exemplary embodiment includes the post-processing device U3. The post-processing device U3 is removably supported by a side surface of the printer body U1, and is also connected to the sheet transport unit U2 to perform post-processing, such as stapling, which may be an example of edge binding, and alignment, on the sheet S output from the sheet output port 2.

In FIGS. 1 and 3 to 5, the post-processing device U3 according to the first exemplary embodiment has a right side wall U3*a* disposed opposite a left side wall U1*b* of the printer body U1. The right side wall U3*a* may be an example of an image-forming-apparatus-body-side wall surface. A sheet input port 3 to be connected to the sheet output port 2 is formed in an upper portion of the right side wall U3*a*. The sheet input port 3 may be an example of an input port of the post-processing device U3. Further, a pair of front and rear hook units U3*a*1 projecting rightward and extending downward is formed in a central portion in the up-down direction of the right side wall U3*a*. The hook units U3*a*1 are fitted into support holes U1*b*1 formed in the left side wall U1*b* of the printer body U1, and are hung on the printer body U1. Therefore, the post-processing device U3 is supported by the printer body U1, and the right side wall U3*a* of the post-processing device U3 is held to extend along the left side wall U1*b* of the printer body U1. The sheet input port 3 is held to be connected to the sheet output port 2 in the sheet transport unit U2.

Thus, the sheet S output from the sheet output port 2 of the sheet transport unit U2 enters or is transported into the post-processing device U3 through the sheet input port 3.

Compile Exit Roller 4 in First Exemplary Embodiment

In FIG. 1, the sheet S that has entered the post-processing device U3 through the sheet input port 3 is transported along a post-processing transport path SH6 in the post-processing device U3 by a pair of post-processing inlet rollers Ra3 provided downstream of the sheet input port 3. The pair of post-processing inlet rollers Ra3 may be an example of a transport member in the post-processing device U3. The sheet S transported along the post-processing transport path SH6 is output onto a compile tray 6 by a compile exit roller 4 provided at a downstream end of the post-processing transport path SH6. The compile tray 6 may be an example of a first stacking unit, and the compile exit roller 4 may be an example of a first exiting member. The compile exit roller 4 according to the first exemplary embodiment is rotated and stopped in response to transmission of the drive from a roller drive motor MA1, which may be an example of an exit drive source.

A compile exit sensor SN1, which may be an example of a media detecting member, is disposed near and upstream of the compile exit roller 4, and detects a sheet S traveling along the post-processing transport path SH6.

Compile Tray 6 in First Exemplary Embodiment

In FIGS. 1 and 3 to 5, the compile tray 6 has a compile tray body 7, which may be an example of a body of the first stacking unit. In FIG. 1, the compile tray body 7 is disposed so as to be inclined to the horizontal so that the left side is higher than the right side.

In FIGS. 3 to 5, an end wall 8 extending upward is supported by the right end of the compile tray body 7. The end wall 8 may be an example of an edge aligning member. Edges, namely, the right edges, of the sheets S output from the compile exit roller 4 and stacked on the compile tray body 7 are caused to abut against the end wall 8, thereby causing the right edges of the bundle of sheets S to be aligned with one another.

A guide wall 9 is formed at an upper end of the end wall 8 in such a manner that the distance between the guide wall 9 and a stacking surface 7*a* of the compile tray body 7 increases as the guide wall 9 extends away from the end wall 8. The guide wall 9 may be an example of a guide unit. The guide wall 9 guides the right edge of a sheet S traveling toward the end wall 8, that is, the upstream edge of the sheet S in a media output direction that is a direction in which media are output, to the end wall 8 when the upstream edge of the sheet S curves or curls.

Main Paddles 11 in First Exemplary Embodiment

Main paddles 11 are rotatably supported at a position diagonally to the front and the left of the guide wall 9. The main paddles 11 may be examples of a second alignment transport member. The main paddles 11 have a rotating shaft 11*a* to which drive is transmitted from a paddle drive motor MA6, and plural cylindrical roller units 11*b* arranged at predetermined intervals along the rotating shaft 11*a*. The paddle drive motor MA6 may be an example of an alignment drive source, and the cylindrical roller units 11*b* may be examples of rotating bodies.

Three flexible plate-shaped paddle bodies 11*c* are supported at predetermined phase intervals on an outer peripheral surface of each of the roller units 11*b*. The paddle bodies 11*c* may be examples of a body of the second alignment transport member. The paddle bodies 11*c* according to the first exemplary embodiment extend in tangential directions extending upstream of the outer peripheral surface of the roller units 11*b* with respect to a direction in which sheets S travel toward the end wall 8, and the outer end of each of the paddle bodies 11*c* has such a length as to be capable of coming into contact with the stacking surface 7*a* of the compile tray body 7.

The rotation of the main paddles 11 enables the paddle bodies 11*c* to be brought into contact with the top surface of the stack of sheets S on the compile tray 6. Therefore, the stack of sheets S is transported toward the end wall 8 by the main paddles 11, and is aligned by causing the right edges of the sheets S to abut against the end wall 8.

Tamper 12 in First Exemplary Embodiment

A pair of front and rear tampers 12 is disposed in a left portion of the compile tray 6 in order to align the edges in the width direction of the sheets S stacked on the compile tray 6 while coming into contact with the edges in the width direction of the sheets S. The tampers 12 may be examples of a widthwise edge alignment member.

The configuration of the tampers 12 will be described in detail below.

Stapler 13 in First Exemplary Embodiment

In FIGS. 3 to 5, a stapler 13, which may be an example of a binding member, is disposed at a position diagonally downward and to the right of the compile tray 6. The stapler 13 binds a bundle of sheets S stacked and aligned on the compile tray 6, with staples. The staples may be examples of binding needles.

The configuration of the stapler 13 will be described in detail below.

Stacker Exit Roller 16 in First Exemplary Embodiment

In FIGS. 3 to 5, a stacker exit roller 16 is disposed downstream of the compile tray body 7 in the media output direction, or leftward. The stacker exit roller 16 may be an example of a transport member and also an example of a second exiting member. The stacker exit roller 16 has a rotating shaft 16*a* to which drive is transmitted from a forward and reverse rotatable stacker exit motor MA2, and roller bodies 16*b* supported at predetermined intervals along the rotating shaft 16*a*. The stacker exit motor MA2 may be an example of a drive source, and the roller bodies 16*b* may be examples of rotation units. The stacker exit roller 16 rotates in the forward and reverse directions in accordance with the forward and reverse rotation of the stacker exit motor MA2. The stacker exit motor MA2 that drives the stacker exit roller 16 according to the first exemplary embodiment may be a stepping motor that rotates at a predetermined rotation angle each time a pulse signal, which may be an example of a predetermined input signal, is input.

During the reverse rotation, the stacker exit roller 16 according to the first exemplary embodiment causes sheets S stacked on the compile tray 6 and subjected to post-processing such as alignment and stapling to exit to a stacker tray TH1, which may be an example of a second stacking unit. In addition, during the forward rotation, the stacker exit roller 16 causes a sheet S output onto the compile tray 6 to move toward the end wall 8.

Shelf 17 in First Exemplary Embodiment

In FIG. 5, a shelf 17, which may be an example of an extending member, is disposed near the stacker exit roller 16 between the rotating shaft 16*a* of the stacker exit roller 16 and the lower surface of the compile tray body 7.

In FIG. 5, the shelf 17 has a plate-shaped shelf body 17*a* that curves in an arc shape, and an arc-shaped rack gear 17*b* formed on a lower surface of the shelf body 17*a*. The shelf body 17*a* may be an example of a body of the extending member, and the rack gear 17*b* may be an example of a drive receiving unit. The rack gear 17*b* meshes with a shelf drive gear 18 disposed downward from the rotating shaft 16*a* of the stacker exit roller 16. Drive is transmitted to the shelf drive gear 18 from a forward and reverse rotatable shelf drive motor MA3, which may be an example of an extending drive source. In accordance with the forward and reverse rotation of the motor MA3, the shelf 17 moves between an extending position indicated by a solid line in FIG. 5 at which the bottom surface of a sheet S is supportable and an accommodation position indicated by a broken line in FIG. 5 at which the shelf 17 is accommodated in the post-processing device U3.

The stacker exit roller 16 and the shelf 17 are known in the art, and may have any of various known configurations described in, for example, Japanese Unexamined Patent Application Publications No. 2006-69746, No. 2006-69749, No. 2011-88682, and No. 2011-88683, the detailed description of which is omitted.

Clamp Roller 21 in First Exemplary Embodiment

In FIG. 3, a clamp roller 21, which may be an example of an exit driven member, is disposed upward of the compile tray body 7 so as to correspond to the stacker exit roller 16. The clamp roller 21 is supported by a leading end of a clamp arm 22 supported so as to be rotatable about a rotating shaft 22*a*. The clamp arm 22 may be an example of an arm member. In accordance with the rotation of the clamp arm 22, the clamp roller 21 is supported so as to be movable between an up position indicated by a solid line in FIG. 3 and a down position indicated by a broken line in FIG. 3. The up position may be an example of a spaced apart position at which the clamp roller 21 is spaced apart from the stacker exit roller 16. The down position may be an example of a contact position at which, as a result of approaching the stacker exit roller 16, the clamp roller 21 is in contact with the sheet S so that the sheet S is held between the clamp roller 21 and the stacker exit roller 16.

Sub-Paddles 23 in First Exemplary Embodiment

In FIG. 4, the sub-paddles 23 are disposed at positions shifted in the front-rear direction of the clamp roller 21. The sub-paddles 23 may be examples of a first alignment transport member. In the first exemplary embodiment, plural sub-paddles 23 are arranged at predetermined intervals in the front-rear direction, and each of the sub-paddles 23 has a configuration similar to that of each of the main paddles 11, the detailed description of which is omitted. The sub-paddles 23 are supported by a leading end of a paddle arm 24 that is supported so as to be rotatable about a rotating shaft 24*a*. The paddle arm 24 may be an example of an arm member. Each of the sub-paddles 23 is supported so as to be movable between a wait position indicated by a solid line in FIG. 4 and a retracted position indicated by a broken line in FIG. 4 in accordance with the rotation of the paddle arm 24. At the wait position, the sub-paddle 23 is spaced apart from the stacking surface 7*a* of the compile tray 6 as a result of upward movement. At the retracted position, the sub-paddle 23 is close to the stacking surface 7*a* of the compile tray 6 as a result of downward movement, and the sheet S on the compile tray 6 is retracted into the end wall 8.

A mechanism for moving up and down the clamp roller 21 and the sub-paddles 23 and a mechanism for driving the sub-paddles 23 are known in the art, and may have any of various known configurations described in, for example, Japanese Unexamined Patent Application Publications No. 2006-69727, No. 2006-69746, and No. 2006-69749, the detailed description of which is omitted. While in the first exemplary embodiment, the paddle drive motor MA6 that is a drive source for the main paddles 11 is also used as a drive source for the sub-paddles 23, an independent drive source for the sub-paddles 23 may be provided.

Stacker Tray TH1 in First Exemplary Embodiment

In FIGS. 1 and 3 to 5, the stacker tray TH1 onto which the sheets S stacked on the compile tray 6 are output is supported by a left side wall U3*b* of the post-processing device U3. The stacker tray TH1 may be an example of a second stacking unit. The stacker tray TH1 has a tray guide 26 extending in the up-down direction along the left side wall U3*b* of the post-processing device U3. The tray guide 26 may be an example of an upward and downward movement guide unit. The tray guide 26 has a slider 27 supported thereon so as to be capable of moving up and down along the tray guide 26. The slider 27 may be an example of an exit movement unit. A stacker tray body 28, which may be an example of a body of the second stacking unit, is fixedly supported by the slider 27.

The stacker tray TH1 is configured to move down in accordance with the height of the top surface of the stack of sheets S on the upper surface of the stacker tray body 28. A mechanism for moving up and down the stacker tray TH1 is known in the art, and may have any of various configurations, such as moving up and down mechanisms described in, for example, Japanese Unexamined Patent Application Publications No. 7-300270 and No. 2003-089463, the detailed description of which is omitted.

Details of Stapler 13 in First Exemplary Embodiment

Figure 6:
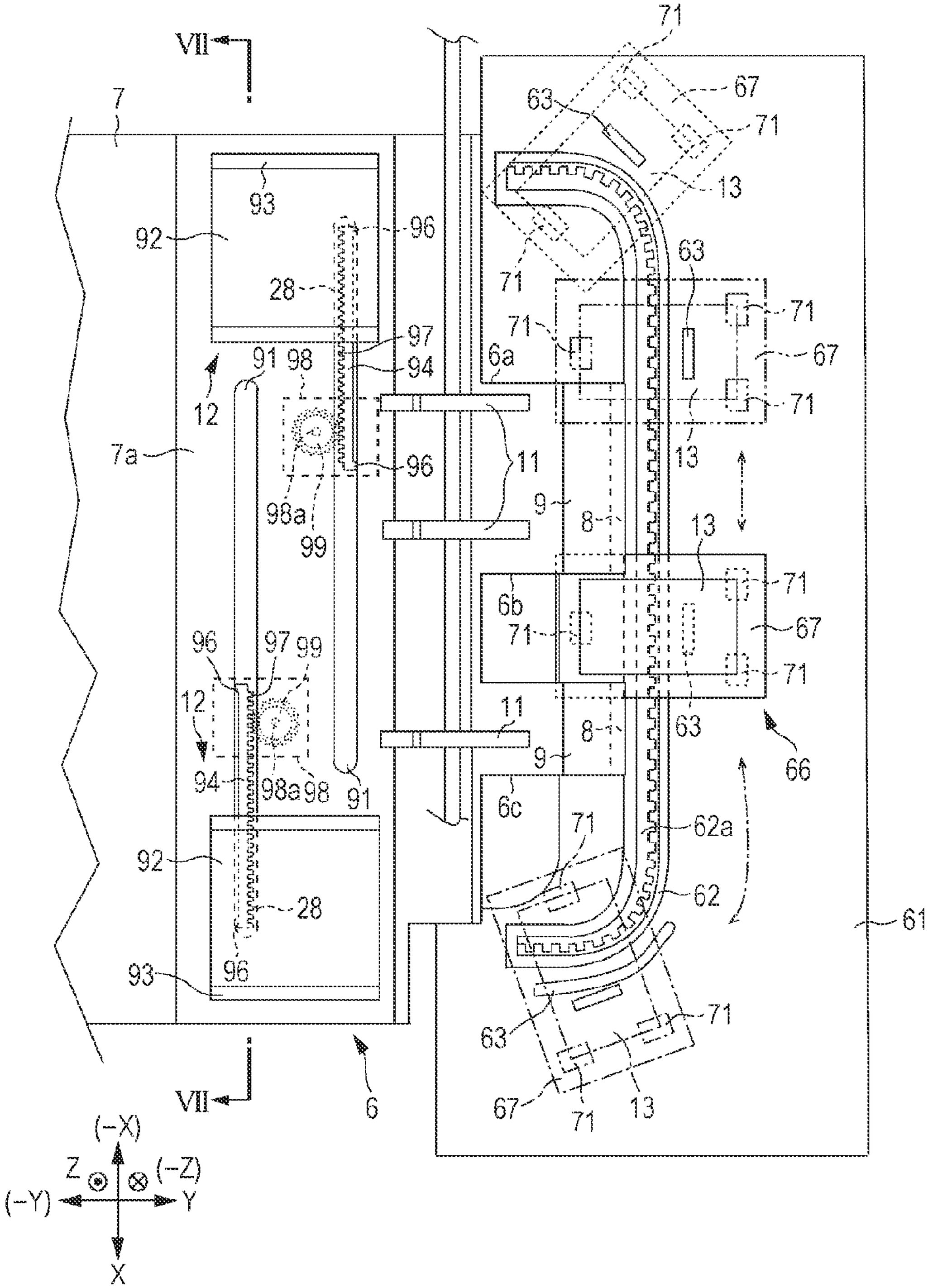
FIG. 6 illustrates a substantial part of the rear end of a compile tray according to the first exemplary embodiment.

FIG. 6 illustrates a substantial part of the rear end of the compile tray 6 according to the first exemplary embodiment.

In FIGS. 5 and 6, a stapler support member 61, which may be an example of a support member of a binding device, is supported downward and to the right of the end wall 8 according to the first exemplary embodiment. The stapler support member 61 according to the first exemplary embodiment extends along the end wall 8 in the front-rear direction, which is the width direction of a sheet S, and is formed in a plate shape that is inclined so that the right side is lower than the left side, like the compile tray body 7.

The stapler support member 61 has a stapler guide 62 formed thereon so as to project upward therefrom. The stapler guide 62 extends in the front-rear direction and curves inward in the front-rear direction so as to form arcs at both front and rear ends of the stapler guide 62. The stapler guide 62 may be an example of a guide member of the binding device. The stapler guide 62 has a stapler guide groove 62*a* formed in a center portion thereof in the left-right direction so as to extend along the stapler guide 62 and extend through the stapler guide 62 in the up-down direction. The stapler guide groove 62*a* may be an example of a body of the guide member of the binding device. Rack teeth 62*b*, which may be examples of flat-plate-shaped gear teeth, are formed on the right inner surface of the stapler guide groove 62*a*.

In FIGS. 5 and 6, the stapler support member 61 has plate-shaped light-shielding ribs 63 disposed to the right of the stapler guide 62. The light-shielding ribs 63 extend upward, and may be examples of detected units. In FIG. 6, the light-shielding ribs 63 according to the first exemplary embodiment are disposed in accordance with positions at which the stapler 13 is to stop, and are located at four positions at which the stapler 13 according to the first exemplary embodiment is to bind a bundle of sheets S, that is, at the front edge corner, the front center, the rear center, and the rear edge corner. That is, the stapler 13 according to the first exemplary embodiment may have capabilities of "front edge corner binding" for binding sheets S at the front edge corner, "side edge binding" for binding sheets S at the front center and rear center, and "rear edge corner binding" for binding sheets S at the rear edge corner.

As illustrated in FIG. 6, binding cutout portions 6*a*, 6*b*, and 6*c* are formed in the front edge, center, and rear of the right edge of the compile tray body 7 and the end wall 8 so as to correspond to positions where the stapler 13 is to perform binding processing, that is, stapling processing.

Movable Stapling Unit 66 in First Exemplary Embodiment

In FIGS. 5 and 6, a movable stapling unit 66, which may be an example of a movable binding device, is supported by the stapler support member 61. In FIG. 5, the movable stapling unit 66 according to the first exemplary embodiment has a plate-shaped carriage 67 as an example of a moving body. The carriage 67 is disposed above the stapler guide 62 so as to straddle the stapler guide 62. The carriage 67 has roller support units 68 and 69 formed at both right and left ends thereof, respectively. The roller support units 68 and 69 extend downward, and may be examples of a guided member support unit. A drive coupling unit 68*a* extending leftward is formed on the lower end of the left roller support unit 68.

Rollers 71, which may be examples of a guided member, are rotatably supported by the roller support units 68 and 69. The rollers 71 come into contact with the upper surface of the stapler support member 61. In FIG. 6, one roller 71 according to the first exemplary embodiment is supported by the left roller support unit 68, and a pair of rollers 71 are supported by the right roller support unit 69 at an interval in the front-rear direction.

In FIG. 5, the upper end of a shaft 72 extending downward so as to be received in the stapler guide groove 62*a* is rotatably supported by the carriage 67. The shaft 72 may be an example of a drive shaft. A stapler moving gear 73 whose teeth mesh with the rack teeth 62*b* is supported by the shaft 72. The stapler moving gear 73 may be an example of a drive member of the binding device.

Drive is transmitted to the lower end of the shaft 72 from a stapler moving motor 74. The stapler moving motor 74 may be an example of a binding drive source.

The stapler moving motor 74 is supported by a plate-shaped motor support plate 76, which may be an example of a drive source support member, and the motor support plate 76 is supported by the drive coupling unit 68*a* through a coupling shaft 77 supported by the left end of the motor support plate 76. The coupling shaft 77 may be an example of a coupling member. Therefore, the stapler moving motor 74 is supported so as to be movable integrally with the carriage 67 through the motor support plate 76 and the coupling shaft 77. When the stapler moving motor 74 is driven to rotate in the forward and reverse directions, the stapler moving gear 73 whose teeth mesh with the rack teeth 62*b* rotates in the forward and reverse directions, and the carriage 67 moves along the stapler guide groove 62*a*.

In FIG. 5, an optical sensor 78, which may be an example of a detection member, is supported by the lower surface of the carriage 67 so as to correspond to the positions of the light-shielding ribs 63. The optical sensor 78 according to the first exemplary embodiment includes a light emitting unit 78*a* that outputs light, and a light receiving unit 78*b* that receives light such that the light emitting unit 78*a* and the light receiving unit 78*b* face each other and such that the light-shielding ribs 63 are allowed to enter between the light emitting unit 78*a* and the light receiving unit 78*b*. In accordance with the movement of the carriage 67, one of the light-shielding ribs 63 enters between the light emitting unit 78*a* and the light receiving unit 78*b* and light is blocked. At this time, the movement of the movable stapling unit 66 to a binding position is detectable.

A stapler motor unit 81, which may be an example of a binding operation device, is supported by the upper surface of the carriage 67, and the stapler 13 is supported by the upper surface of the stapler motor unit 81.

The stapler 13 according to the first exemplary embodiment includes, a needle shooting unit 82*a* that shoots staples, which may be examples of binding needles, and a needle bending unit 82*b* disposed opposite the needle shooting unit 82*a*. The needle bending unit 82*b* bends a staple shot from the needle shooting unit 82*a* and inserted through a bundle of sheets S at a leading end of the staple. The needle shooting unit 82*a* is supported so as to be rotatable about a center of rotation 82*c* with respect to the needle bending unit 82*b*.

A stapler operating member 83, which may be an example of a binding operation member, is supported between the needle shooting unit 82*a* and the needle bending unit 82*b*. The stapler operating member 83 has an end 83*a* coupled to the needle shooting unit 82*a*, and another end on which an annular operated unit 83*b* is formed.

An eccentric cam 84, which may be an example of an eccentric member, is rotatably supported by the operated unit 83*b*. The eccentric cam 84 has a rotating shaft 84*a* on which a drive receiving gear 86 (not illustrated) is supported as an example of a gear, and drive is transmitted to the drive receiving gear 86 from an output gear 88 supported by an output shaft 81*a* of the stapler motor unit 81 through an intermediate gear 87. The intermediate gear 87 may be an example of an intermediate gear, and the output gear 88 may be an example of an output gear.

When the stapler motor unit 81 operates, the eccentric cam 84 rotates through the gears 86 to 88 and the end 83*a* of the stapler operating member 83 moves in the up-down direction. Therefore, the needle shooting unit 82*a* is brought into proximity to the needle bending unit 82*b* to hold the bundle of sheets S between the needle shooting unit 82*a* and the needle bending unit 82*b*, and a staple or staples are shot to bind the bundle of sheets S.

The stapler 13, the members 67 to 88, etc., constitute the movable stapling unit 66 according to the first exemplary embodiment.

In the movable stapling unit 66 according to the first exemplary embodiment, the stapler 13, the stapler motor unit 81, etc. are disposed above the carriage 67 disposed upward of the stapler support member 61, and the center of gravity of the overall movable stapling unit 66 is higher than the stapler support member 61 in the direction of gravity.

Details of Tamper 12 in First Exemplary Embodiment

Figure 7:
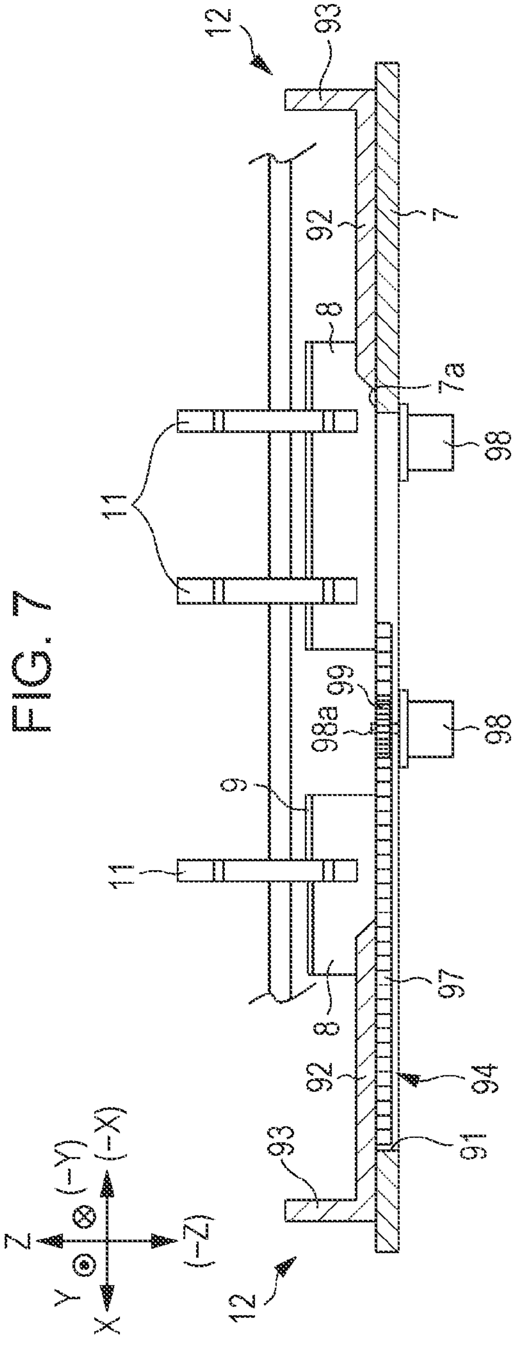
FIG. 7 is a cross-sectional view taken along line VII-VII in FIG. 6.

FIG. 7 is a cross-sectional view taken along line VII-VII in FIG. 6.

Figure 8A:
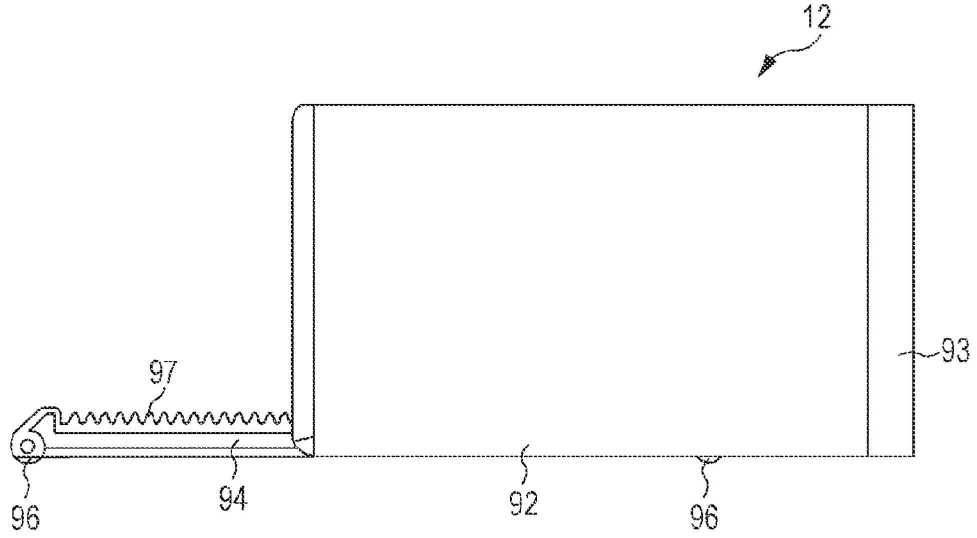
FIGS. 8A and 8B are diagrams of tampers according to the first exemplary embodiment when viewed from the top and the bottom, respectively.
Figure 8B:
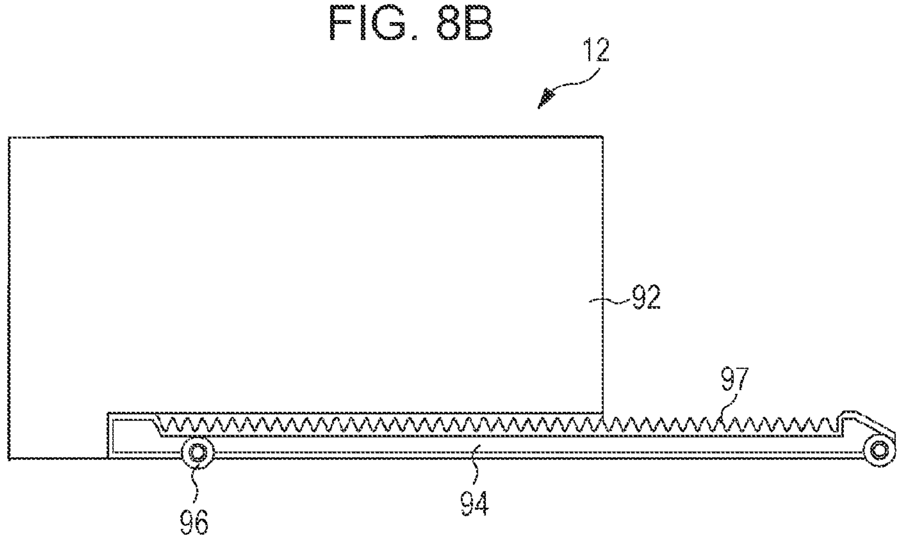

FIGS. 8A and 8B illustrate the tampers 12 according to the first exemplary embodiment. FIG. 8A is a diagram of the tampers 12 when viewed from the top, and FIG. 8B is a diagram of the tampers 12 when viewed from the bottom.

In FIGS. 6 and 7, each of the tampers 12 according to the first exemplary embodiment is supported so as to be movable along a tamper guide groove 91 formed in the compile tray body 7 so as to extend in the front-rear direction. The tamper guide grooves 91 may be examples of a guide unit of an alignment member. In FIGS. 6, 7, 8A, and 8B, each of the tampers 12 according to the first exemplary embodiment has a plate-shaped bottom board portion 92 extending along the stacking surface 7*a* of the compile tray body 7. A plate-shaped tamper body 93 extending upward, which may be an example of a body of the alignment member, is formed on the outer edges of the bottom board portion 92 in the front-rear direction.

A guided rod 94 is supported by the bottom portion of the bottom board portion 92 as an example of a guided member of the alignment member. The guided rod 94 is formed in a plate shape extending in the front-rear direction, and is received in the tamper guide groove 91. In FIG. 8B, a pair of roller-shaped guided rollers 96 are formed at both ends of the guided rod 94 in the front-rear direction. The roller-shaped guided rollers 96 may be examples of guided units, and are rotatably supported in contact with the inner surface of the tamper guide groove 91. Tamper rack teeth 97, which may be an example of a drive receiving unit, are formed on a side surface of the guided rod 94 opposite to the surface on which the guided rollers 96 are formed, so as to extend along the side surface of the guided rod 94.

In FIGS. 6 and 7, a pair of front and rear tamper drive motors 98, which may be examples of a drive source of the alignment member, are disposed on a lower surface of the compile tray body 7 in a center portion thereof in the front-rear direction so as to correspond to the respective tampers 12. Similarly to the stacker exit motor MA2, the tamper drive motors 98 according to the first exemplary embodiment may be formed of stepping motors, and are configured to be rotatable in the forward and reverse directions.

Each of the tamper drive motors 98 has a rotating shaft 98*a* on which a tamper drive gear 99 whose teeth mesh with the tamper rack teeth 97 is supported as an example of a drive transmitting member. The forward and reverse rotation of the tamper drive motors 98 allows the tampers 12 to move in the sheet width direction through the tamper drive gears 99 and the tamper rack teeth 97 and to come into contact with the edges in the width direction of the sheets S at which the tamper bodies 93 are mounted. Then, alignment is performed.

The members 7 and 93 to 99 constitute a tamper drive transmission system (7+93 to 99) according to the first exemplary embodiment.

Drive Transmission Systems 101 to 113 in First Exemplary Embodiment

Figure 9A:
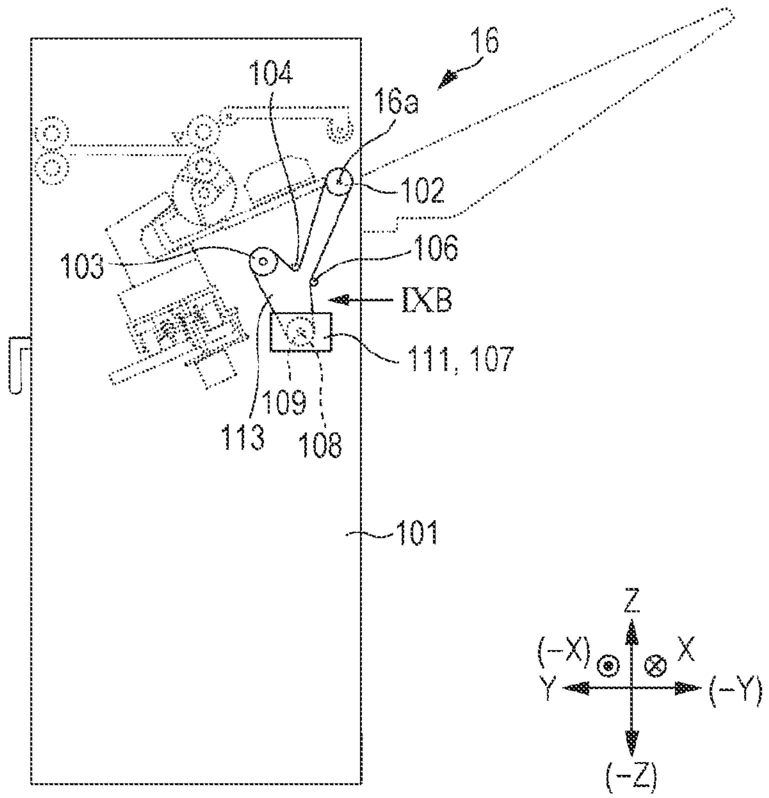
Figure 9B:
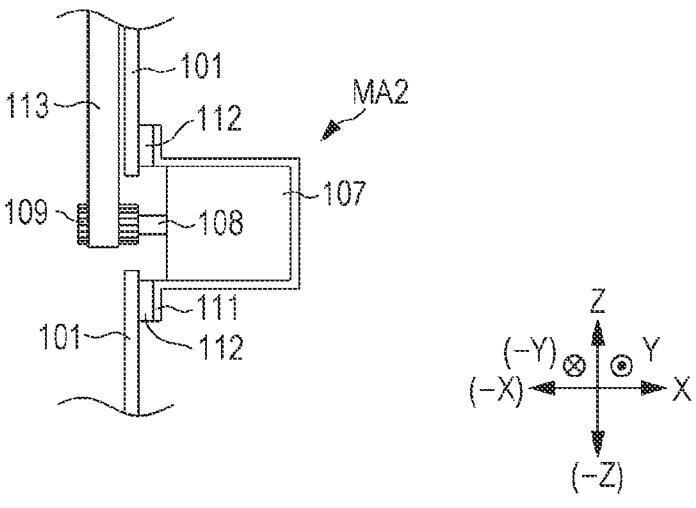

FIGS. 9A and 9B illustrate a drive transmission system according to the first exemplary embodiment. FIG. 9A illustrates a substantial part of the drive transmission system when the post-processing device U3 is viewed from rear to front, and FIG. 9B illustrates a substantial part of the stacker exit motor MA2, a gear, and a timing belt according to the first exemplary embodiment.

In FIG. 9A, the post-processing device U3 according to the first exemplary embodiment has a rear frame 101 that rotatably supports the rear end of the rotating shaft 16*a* of the stacker exit roller 16. The rear frame 101 may be an example of a support member. A first driven timing pulley 102 is fixedly supported by the rear end of the rotating shaft 16*a*. The first driven timing pulley 102 may be an example of a first gear member and also an example of a first driven member. Further, a second driven timing pulley 103 extending rearward from and rotatably supported by the rear frame 101 is disposed at a position diagonally downward and to the right, or, in FIG. 9A, diagonally downward and to the left, of the first driven timing pulley 102 at a position that is not related to the compile tray 6 or the movable stapling unit 66. The second driven timing pulley 103 may be an example of a second gear member and also an example of a second driven member.

Further, a third driven pulley 104 and a fourth driven pulley 106, which extend rearward from and are rotatably supported by the rear frame 101, are disposed at a position diagonally downward and to the left, or, in FIG. 9A, diagonally downward and to the right, of the second driven timing pulley 103 and disposed at a position diagonally downward and to the right of the first driven timing pulley 102, respectively. The third driven pulley 104 and the fourth driven pulley 106 may be an example of third and fourth driven members, respectively. Further, the stacker exit motor MA2 is disposed downward from the pulleys 102, 103, 104, and 106.

In FIG. 9B, the stacker exit motor MA2 has a motor body 107, and a shaft 108 extending rearward from and rotatably supported by the motor body 107. The motor body 107 may be an example of a drive source body, and the shaft 108 may be an example of a rotating shaft. A pinion gear 109, which may be an example of a gear, is fixedly supported by the rear end of the shaft 108. The number of teeth g1 of the pinion gear 109 according to the first exemplary embodiment is prime, for example, 23, and the 23 teeth are arranged at intervals of about 15.7°.

Further, a motor bracket 111, which may be an example of an attachment member, is supported by the front surface of the motor body 107, and the rear end of the motor bracket 111 is supported by the rear frame 101 through a vibration absorbing member 112 composed of urethane. The vibration absorbing member 112 may be an example of an elastic member.

A timing belt 113, which may be an example of a meshing member, is stretched across the pulleys 102, 103, 104, and 106 and the pinion gear 109. The timing belt 113 according to the first exemplary embodiment has inner teeth (not illustrated) that mesh with the timing pulleys 102 and 103 and the teeth of the pinion gear 109, and is stretched while the outer surface of the timing belt 113 is in contact with the outer peripheral surfaces of the pulleys 104 and 106. Therefore, the wrap angle of the timing belt 113 around the timing pulleys 102 and 103 and the pinion gear 109 is larger than that obtained in a configuration in which the pulleys 104 and 106 are not provided, and the range in which the teeth mesh with each other is larger. This facilitates stable transmission of drive caused by the driving of the rotation of the pinion gear 109.

The members 101 to 113 constitute drive transmission systems 101 to 113 according to the first exemplary embodiment.

Details of Stacker Exit Motor MA2 in First Exemplary Embodiment

Figure 10A:
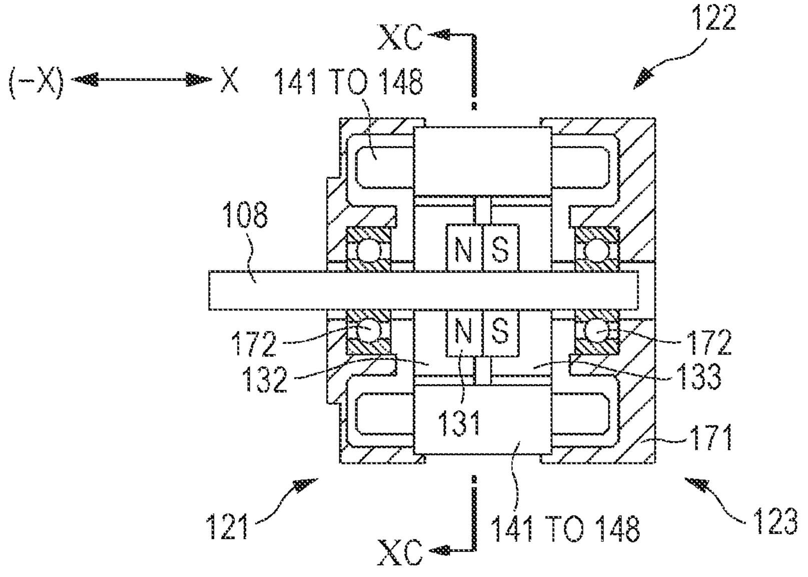
Figure 10B:
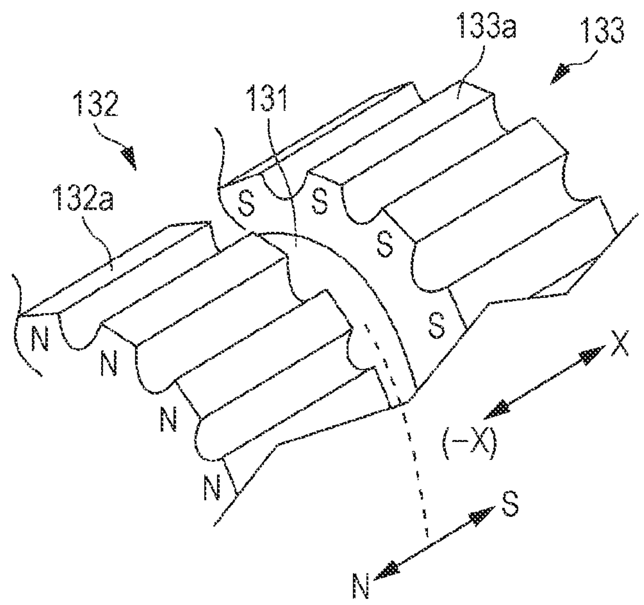
Figure 10C:
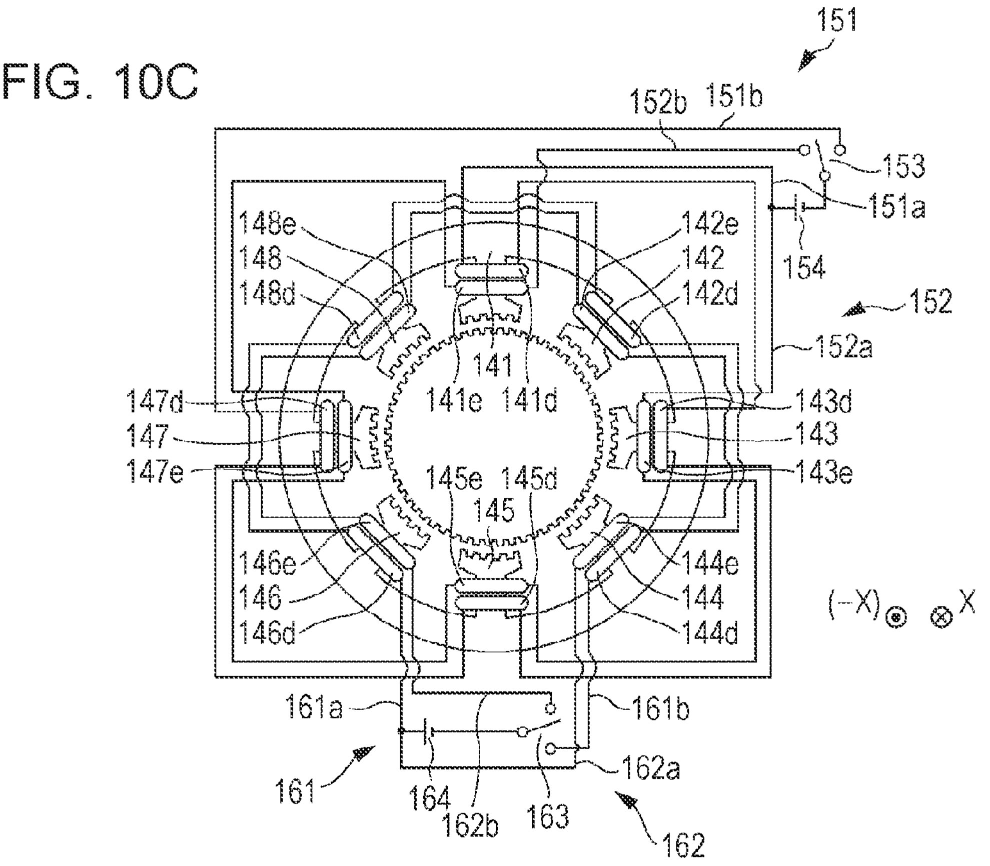
Figure 10D:
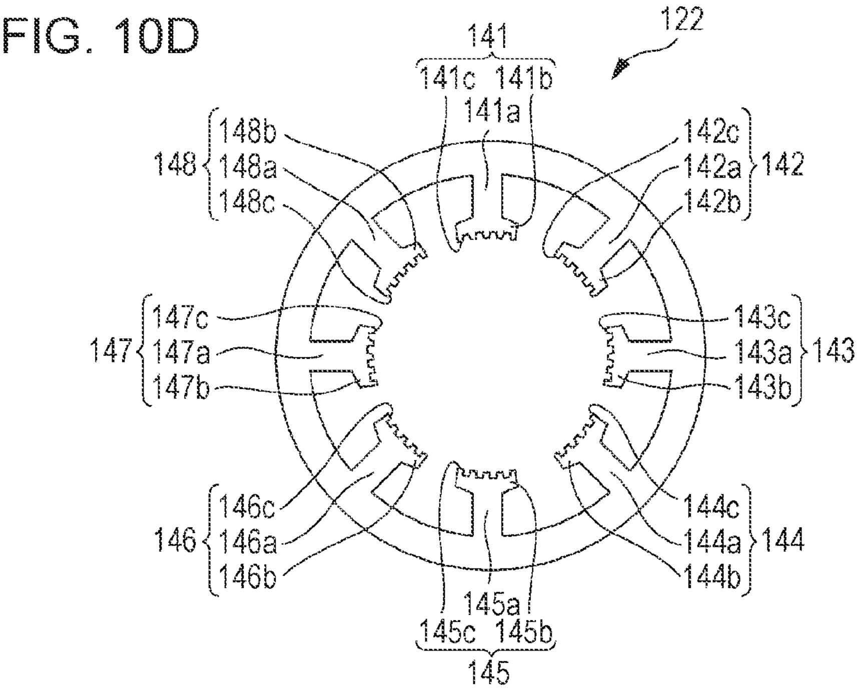

FIGS. 10A to 10D illustrate a stacker exit motor according to the first exemplary embodiment. FIG. 10A is a cross-sectional view of the motor body 107, FIG. 10B is an enlarged perspective view of the teeth of a rotor, FIG. 10C is a cross-sectional view taken along line XC-XC in FIG. 10A, and FIG. 10D illustrates the substantial part of a stator unit in which coils and a power supply are removed from the configuration illustrated in FIG. 10C.

Since the stacker exit motor MA2 and the tamper drive motors 98 included in the post-processing device U3 have similar stepping motor configurations, only the stacker exit motor MA2 will be described.

In FIGS. 10A to 10D, the stacker exit motor MA2 according to the first exemplary embodiment may be formed of a two-phase hybrid (HB) stepping motor, which may be an example of a drive source that performs driving in accordance with the input of a pulse signal. The motor body 107 includes a rotor unit 121, a stator unit 122, and a housing 123. The rotor unit 121 may be an example of a rotor disposed on the front end of the shaft 108, and the stator unit 122 may be an example of a stator that surrounds the outer periphery of the rotor unit 121. The housing 123 may be an example of a frame structure that fixedly supports the stator unit 122 and that rotatably supports the rotor unit 121.

The rotor unit 121 according to the first exemplary embodiment includes a cylindrical permanent magnet 131, which may be an example of a magnet (hereinafter referred to as the "magnet 131"). The magnet 131 is supported by the outer peripheral surface of the shaft 108 and extends in the front-rear direction. As illustrated in FIG. 10A, the magnet 131 according to the first exemplary embodiment is disposed so that the N pole is directed rearward and the S pole is directed forward. A tubular first rotor 132 that surrounds the rear N-pole portion of the magnet 131 and that is magnetized to the N pole, and a tubular second rotor 133 that surrounds the front S-pole portion of the magnet 131 and that is magnetized to the S pole are supported by the magnet 131. The first rotor 132 may be an example of a first rotor, and the second rotor 133 may be an example of a second rotor. The first rotor 132 according to the first exemplary embodiment has teeth 132*a* formed on the outer peripheral surface thereof, and the second rotor 133 according to the first exemplary embodiment has teeth 133*a* formed on the outer peripheral surface thereof. In the first exemplary embodiment, as illustrated in FIG. 10B, the first rotor 132 and the second rotor 133 are arranged such that the teeth 132*a* of the first rotor 132 and the teeth 132*a* of the second rotor 133 are shifted by a ½ pitch with respect to each other, where one pitch represents a center interval between adjacent teeth 132*a* of the first rotor 132 and represents a center interval between adjacent center teeth 133*a* of the second rotor 133. In the first exemplary embodiment, the first rotor 132 has 50 teeth 132*a* formed at intervals of 7.2° and the second rotor 133 has 50 teeth 133*a* formed at intervals of 7.2°.

The stator unit 122 according to the first exemplary embodiment includes eight electromagnets 141, 142, 143, 144, 145, 146, 147, and 148 arranged radially about the shaft 108 at intervals of 45°. In FIG. 10D, the electromagnets 141 to 148 have cores 141*a* to 148*a*, respectively, and each of the cores 141*a* to 148*a* has a proximal end supported by the housing 123 and a free end extending radially toward the rotor unit 121. The free ends of the cores 141*a* to 148*a* according to the first exemplary embodiment have facing walls 141*b* to 148*b*, respectively, which face the outer peripheral surfaces of the rotors 132 and 133 and that extend in the circumferential direction of the rotors 132 and 133. The facing walls 141*b* to 148*b* have teeth 141*c* to 148*c*, respectively, which are arranged spaced apart from the teeth 132*a* and 133*a* of the rotors 132 and 133. In the first exemplary embodiment, the facing walls 141*b* to 148*b* each have five teeth 141*c* to 148*c* formed at intervals of 7.2°.

In FIG. 10C, an $A_+$ phase lead 151, which may be an example of a positive lead having a first phase, and an A_ phase lead 152, which may be an example of a negative lead having the first phase, are wound around the first, third, fifth, and seventh cores 141*a*, 143*a*, 145*a*, and 147*a*. That is, the first, third, fifth, and seventh electromagnets 141, 143, 145, and 147 have $A_+$ phase coils 141*d*, 143*d*, 145*d*, and 147*d*, which may be examples of a positive winding having the first phase, and A_ phase coils 141*e*, 143*e*, 145*e*, and 147*e*, which may be examples of a negative winding having the first phase, respectively. In the first exemplary embodiment, the $A_+$ phase coils 141*d*, 143*d*, 145*d*, and 147*d* are connected to one another using the $A_+$ phase lead 151, and the A_ phase coils 141*e*, 143*e*, 145*e*, and 147*e* are connected to one another using the A_ phase lead 152.

In the first and fifth electromagnets 141 and 145 according to the first exemplary embodiment, the coils 141*d*+141*e* and 145*d*+145*e* are wound around the cores 141*a* and 145*a*, respectively, in a predetermined first winding direction. In the third and seventh electromagnets 143 and 147, the coils 143*d*+143*e* and 147*d*+147*e* are wound around the cores 143*a* and 147*a*, respectively, in a second winding direction opposite to the first winding direction.

In the first exemplary embodiment, furthermore, the $A_+$ phase lead 151 is wound around the first, third, fifth, and seventh cores 141*a*, 143*a*, 145*a*, and 147*a* in this order by a predetermined number of turns N1, and the A_ phase lead 152 is wound around the third, fifth, seventh, and first cores 143*a*, 145*a*, 147*a*, and 141*a* in this order by the same number of turns as the number of turns N1 for the $A_+$ phase lead 151.

The leads 151 and 152 are configured to be connectable to a first power supply 154 via a first switch 153, which may be an example of a first switching member. In the first exemplary embodiment, an end 151*a* of the $A_+$ phase lead 151 on the first electromagnet 141 side and an end 152*a* of the A_ phase lead 152 on the third electromagnet 143 side, which may be examples of a first connecting portion, are connected to the positive (+) side of the first power supply 154. An end 151*b* of the $A_+$ phase lead 151 on the seventh electromagnet 147 side and an end 152*b* of the A_ phase lead 152 on the first electromagnet 141 side, which may be examples of a second connecting portion, are configured to be connectable to the negative (−) side of the first power supply 154 through the first switch 153.

The first switch 153 according to the first exemplary embodiment is configured to be movable between a first position to be connected to the $A_+$ phase lead 151, a second position to be connected to the A_ phase lead 152, and a third position where the first switch 153 disconnects the connection to the leads 151 and 152. In the first exemplary embodiment, therefore, the first switch 153 may be controlled to enable one of the leads 151 and 152 to be energized or none of the leads 151 and 152 to be energized.

In the first exemplary embodiment, in the electromagnets 141, 143, 145, and 147, the direction of a current flowing through the A_ phase lead 152 when the first switch 153 is closed (connection is made) is opposite to the direction of a current flowing through the $A_+$ phase lead 151 when the first switch 153 is closed (connection is made) because the directions of turns in the electromagnets 141, 143, 145, and 147 are opposite. Therefore, the magnetic poles to which the teeth 141*c* to 148*c* are excited by the $A_-$ phase lead 152 are opposite to the magnetic poles to which the teeth 141*c* to 148*c* are excited by the $A_+$ phase lead 151.

In the first exemplary embodiment, when the $A_+$ phase lead 151 is energized, the teeth 141*c* of the first electromagnet 141 and the teeth 145*c* of the fifth electromagnet 145 are excited to the N pole, and the teeth 143*c* of the third electromagnet 143 and the teeth 147*c* of the seventh electromagnet 147 are excited to the S pole. When the $A_-$ phase lead 152 is energized, the teeth 141*c* of the first electromagnet 141 and the teeth 145*c* of the fifth electromagnet 145 are excited to the S pole, and the teeth 143*c* of the third electromagnet 143 of the seventh electromagnet 147 are excited to the N pole.

The second, fourth, sixth, and eighth electromagnets 142, 144, 146, and 148 have $B_+$ phase coils 142*d*, 144*d*, 146*d*, and 148*d*, which may be examples of a positive winding having a second phase, and $B_-$ phase coils 142*e*, 144*e*, 146*e*, and 148*e*, which may be examples of a negative winding having the second phase, respectively, in a manner similar to the first, third, fifth, and seventh electromagnets 141, 143, 145, and 147. In the first exemplary embodiment, a $B_+$ phase lead 161 forming the $B_+$ phase coils 142*d*, 144*d*, 146*d*, and 148*d*, which may be an example of a positive lead having the second phase, is wound around the sixth, eighth, second, and fourth cores 146*a*, 148*a*, 142*a*, and 144*a* in this order by the same number of turns as the number of turns N1 for the $A_+$ phase lead 151 and the $A_-$ phase lead 152. Further, a $B_-$ phase lead 162 forming the $B_-$ phase coils 142*e*, 144*e*, 146*e*, and 148*e*, which may be an example of a negative lead having the second phase, is wound around the fourth, second, eighth, and sixth cores 144*a*, 142*a*, 148*a*, and 146*a* in this order by the same number of turns as the number of turns N1 for the $B_+$ phase lead 161.

The leads 161 and 162 are configured to be connectable to a second power supply 164 via a second switch 163, which may be an example of a second switching member. In the first exemplary embodiment, an end 161*a* of the $B_+$ phase lead 161 on the sixth electromagnet 146 side and an end 162*a* of the $B_-$ phase lead 162 on the fourth electromagnet 144 side, which may be examples of a first connecting portion, are connected to the positive (+) side of the second power supply 164. An end 161*b* of the $B_+$ phase lead 161 on the fourth electromagnet 144 side and an other end 162*b* of the $B_-$ phase lead 162 on the sixth electromagnet 146 side, which may be examples of a second connecting portion, are configured to be connectable to the negative (−) side of the second power supply 164 through the second switch 163.

Further, the second switch 163 according to the first exemplary embodiment is configured in a manner similar to the first switch 153, and is movable between the first, second, and third positions to enable one of the leads 161 and 162 to be energized or none of the leads 161 and 162 to be energized.

In the first exemplary embodiment, therefore, when the $B_+$ phase lead 161 is energized, the teeth 142*c* of the second electromagnet 142 and the teeth 146*c* of the sixth electromagnet 146 are excited to the N pole, and the teeth 144*c* of the fourth electromagnet 144 and the teeth 148*c* of the eighth electromagnet 148 are excited to the S pole. When the $B_-$ phase lead 162 is energized, the teeth 142*c* of the second electromagnet 142 and the teeth 146*c* of the sixth electromagnet 146 are excited to the S pole, and the teeth 144*c* of the fourth electromagnet 144 and the teeth 148*c* of the eighth electromagnet 148 are excited to the N pole.

In addition, the housing 123 according to the first exemplary embodiment has a stator support unit 171 that supports the stator unit 122 while surrounding the electromagnets 141 to 148, and ball bearings 172 that rotatably support the shaft 108, which may be examples of bearings, are supported by both front and rear ends of the housing 123.

Figures 11A, 11B, 11C:
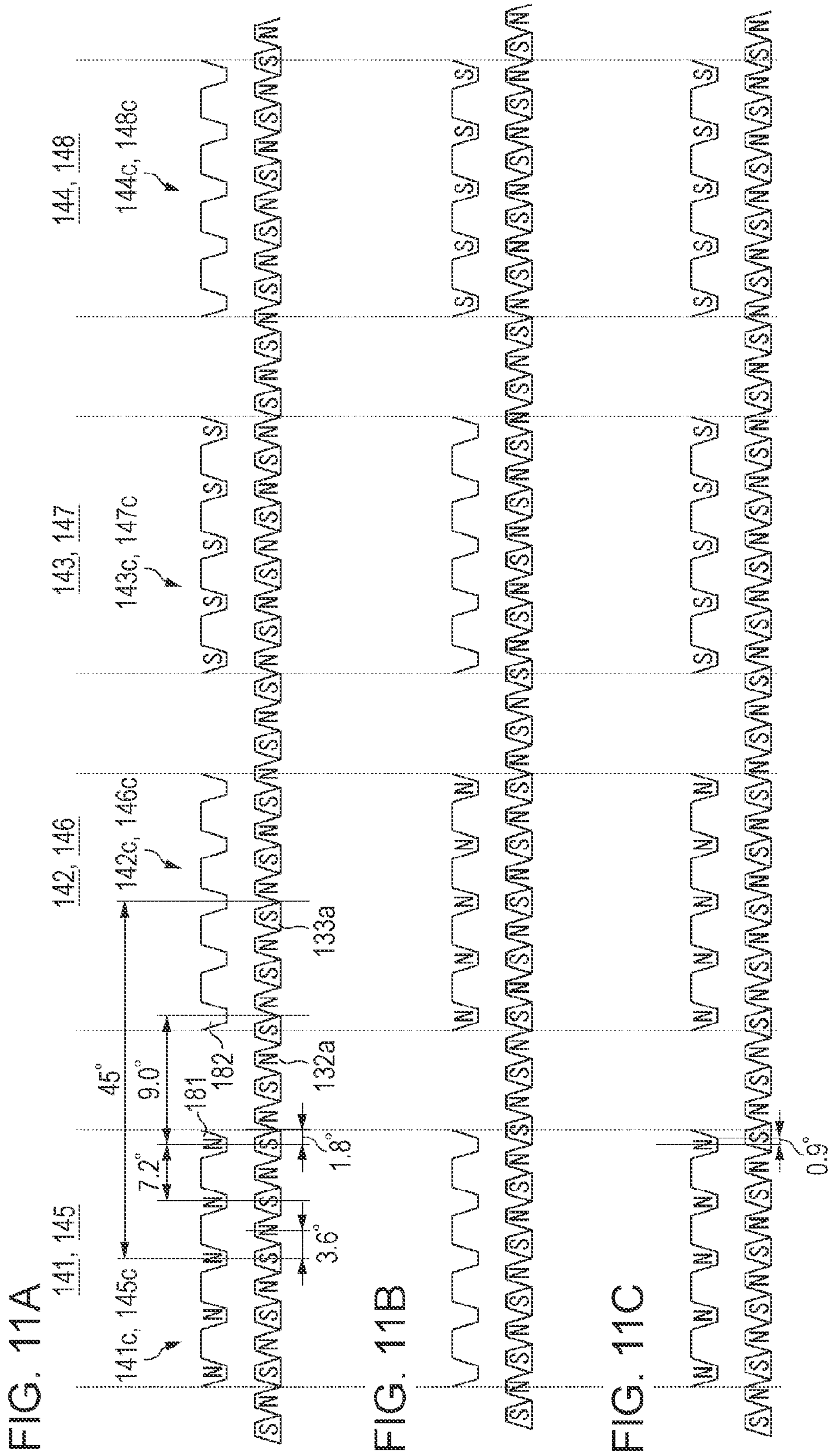

FIGS. 11A to 11C illustrate relationships between rotor teeth and stator teeth when the right direction is the rotation direction. FIG. 11A illustrates a relationship between the rotor teeth and the stator teeth when only the $A_+$ phase coils are energized, FIG. 11B illustrates a relationship between the rotor teeth and the stator teeth when the energization of the $A_+$ phase coils is disconnected after the state illustrated in FIG. 11A and the $B_+$ phase coils are energized, and FIG. 11C illustrates a relationship between the rotor teeth and the stator teeth when the $B_+$ phase coils are energized after the state illustrated in FIG. 11A.

Here, the facing walls 141*b* to 148*b* of the electromagnets 141 to 148 according to the first exemplary embodiment are configured such that the angle defined between adjacent facing walls is given by 45−(7.2×5)=9.0°.

For instance, if the right direction in FIGS. 11A to 11C is the direction of rotation of the shaft 108, the angle defined between a tooth 181 at the downstream end of the first teeth 141*c* in the rotation direction and a tooth 182 at the upstream end of the second teeth 142*c* in the rotation direction is 9.0°.

Therefore, the electromagnets 141 to 148 are arranged such that the teeth 142*c* to 148*c* and 141*c* of the downstream electromagnets 142 to 148 and 141 among the adjacent electromagnets 141 to 148 are shifted from the teeth 132*a* and 133*a* of the rotors 132 and 133 by 9.0−7.2=1.8°, or a ¼ pitch, with respect to the teeth 141*c* to 148*c* of the upstream adjacent electromagnets 141 to 148. Therefore, for example, the third electromagnet 143 is arranged such that the teeth 143*c* of the third electromagnet 143 are shifted downstream from the teeth 132*a* and 133*a* of the rotors 132 and 133 by 1.8×2=3.6°, or a ½ pitch, with respect to the teeth 141*c* of the first electromagnet 141 that is disposed two electromagnets upstream from the third electromagnet 143.

The electromagnets 141 to 148 according to the first exemplary embodiment are configured such that the coils (141*d*+141*e*) to (148*d*+148*e*) are wound around the cores 141*a* to 148*a*, respectively, by the same number of coil turns, and the N pole or the S pole having the same magnetic force is generated when the leads 151, 152, 161, and 162 are energized.

As a result, when the $A_+$ phase lead 151 is energized, the S pole teeth 133*a* of the second rotor 133 are attracted by a magnetic force towards the first and fifth teeth 141*c* and 145*c* which are excited to the N pole, and are made to face the first and fifth teeth 141*c* and 145*c*. At this time, the N pole teeth 132*a* of the first rotor 132 are attracted by a magnetic force towards the third and seventh teeth 143*c* and 147*c* which are excited to the S pole. Therefore, the teeth 132*a* and 133*a* of the rotors 132 and 133 become stable in the state illustrated in FIG. 11A where the teeth 132*a* and 133*a* face the teeth (143*c*+147*c*) and (141*c*+145*c*) which are excited to a magnetic pole. In this case, as illustrated in FIG. 11A, the second rotor 133 is arranged such that the S pole teeth 133*a* of the second rotor 133 are shifted a ¼ pitch upstream from and a ¾ pitch downstream from the second and sixth teeth 142*c* and 146*c* having no magnetic pole. In addition, the first rotor 132 is arranged such that the N pole teeth 132*a* of the first rotor 132 are shifted a ¼ pitch upstream from and a ¾ pitch downstream from the fourth and eighth teeth 144*c* and 148*c* having no magnetic pole.

When the energization of the $A_+$ phase lead 151 is disconnected after the state illustrated in FIG. 11A and the $B_+$ phase lead 161 is energized, the second rotor 133 is arranged such that S pole teeth 133*a* of the second rotor 133 on the upstream side are closer to the second and sixth teeth 142*c* and 146*c* which are excited to the N pole than S pole teeth 133*a* of the second rotor 133 on the downstream side by a ½ pitch. Therefore, the S pole teeth 133*a* on the downstream side are attracted towards the N pole teeth 142*c* and 146*c* on the upstream side by a magnetic force without the S pole teeth 133*a* on the upstream side being attracted towards the N pole teeth 142*c* and 146*c* on the downstream side, and are made to face the N pole teeth 142*c* and 146*c* on the upstream side. Further, the first rotor 132 is arranged such that, similarly to the S pole teeth 133*a*, N pole teeth 132*a* of the first rotor 132 on the upstream side are closer to the fourth and eighth teeth 144*c* and 148*c* which are excited to the S pole than N pole teeth 132*a* of the first rotor 132 on the downstream side by a ½ pitch. Therefore, the N pole teeth 132*a* on the downstream side are attracted towards the S pole teeth 144*c* and 148*c* on the upstream side by a magnetic force, and are made to face the S pole teeth 144*c* and 148*c*. As a result, the rotors 132 and 133 become stable, without reversely rotating, in the state illustrated in FIG. 11B where the rotors 132 and 133 move downstream in the rotation direction by a ¼ pitch.

When the $B_+$ phase lead 161 is energized without the energization of the $A_+$ phase lead 151 being disconnected after the state illustrated in FIG. 11A, the S pole teeth 133*a* of the second rotor 133 are also attracted by the same magnetic force as the N pole teeth 141*c* and 145*c* towards the second and sixth teeth 142*c* and 146*c* which are newly excited to the N pole. Therefore, the magnetic force of the N pole teeth 142*c* and 146*c* attracts the S pole teeth 133*a* to intermediate positions between the positions at which the S pole teeth 133*a* are shifted upstream from the N pole teeth 142*c* and 146*c* by a ¼ pitch and the positions at which the S pole teeth 133*a* face the N pole teeth 142*c* and 146*c*.

Further, similarly to the S pole teeth 133*a*, the N pole teeth 132*a* of the first rotor 132 are also attracted by the same magnetic force as the S pole teeth 143*c* and 147*c* towards the fourth and eighth teeth 144*c* and 148*c* which are newly excited to the S pole. Therefore, the magnetic force of the S pole teeth 144*c* and 148*c* attracts the N pole teeth 132*a* to intermediate positions between the positions at which the N pole teeth 132*a* are shifted upstream from the S pole teeth 144*c* and 148*c* by a ¼ pitch and the positions at which the N pole teeth 132*a* face the S pole teeth 144*c* and 148*c*.

Consequently, the rotors 132 and 133 rotate and move only half the rotation and movement in the state illustrated in FIG. 11B, and become stable in the state illustrated in FIG. 11C where the rotors 132 and 133 are moved downstream in the rotation direction by a ⅛ pitch.

When the energization of the $A_+$ phase lead 151 is disconnected after the state illustrated in FIG. 11C and only the $B_+$ phase lead 161 is energized, the rotors 132 and 133 become stable, without reversely rotating, in the state illustrated in FIG. 11B where the rotors 132 and 133 are moved downstream in the rotation direction by a ⅛ pitch.

In addition, when the energization of the $B_+$ phase lead 161 is disconnected after the state illustrated in FIG. 11B and only the $A\_$ phase lead 152 is energized, similarly to when the state illustrated in FIG. 11A is changed to the state illustrated in FIG. 11B, the rotors 132 and 133 become stable, without reversely rotating, in the state where the rotors 132 and 133 are moved downstream in the rotation direction by a ¼ pitch. Additionally, when the $A\_$ phase lead 152 is energized without the energization of the $B_+$ phase lead 161 being disconnected after the state illustrated in FIG. 11B, similarly to when the state illustrated in FIG. 11A is changed to the state illustrated in FIG. 11C, the rotors 132 and 133 become stable, without reversely rotating, in the state where the rotors 132 and 133 are moved downstream in the rotation direction by a ⅛ pitch.

When the energization of the $A_+$ phase lead 151 is disconnected while the $B_+$ phase lead 161 is being energized after the state illustrated in FIG. 11C and the $A\_$ phase lead 152 is energized, the rotors 132 and 133 become stable, without reversely rotating, in the state where the rotors 132 and 133 are moved downstream in the rotation direction by a ¼ pitch.

In the first exemplary embodiment, therefore, in a one-phase excitation method in which the leads 151, 152, 161, and 162 are periodically energized in the order of only the $A_+$ phase lead 151, only the $B_+$ phase lead 161, only the $A\_$ phase lead 152, and only the $B\_$ phase lead 162 in accordance with a pulse signal, the shaft 108 rotates in the rotation direction by a ¼ pitch for each pulse. Also in a two-phase excitation method in which the leads 151, 152, 161, and 162 are periodically energized in the order of a set of the $A_+$ phase lead 151 and the $B_+$ phase lead 161, a set of the $B_+$ phase lead 161 and the $A\_$ phase lead 152, and a set of the $A\_$ phase lead 152 and the $B\_$ phase lead 162, the shaft 108 rotates in the rotation direction by a ¼ pitch for each pulse.

That is, in one-phase excitation or two-phase excitation, four steps of energization control are executed for each pulse, and the shaft 108 rotates by a ¼ pitch with the magnetic poles of the teeth 141*c* to 148*c* being changed by 45° in the rotation direction by one step.

Figure 12:
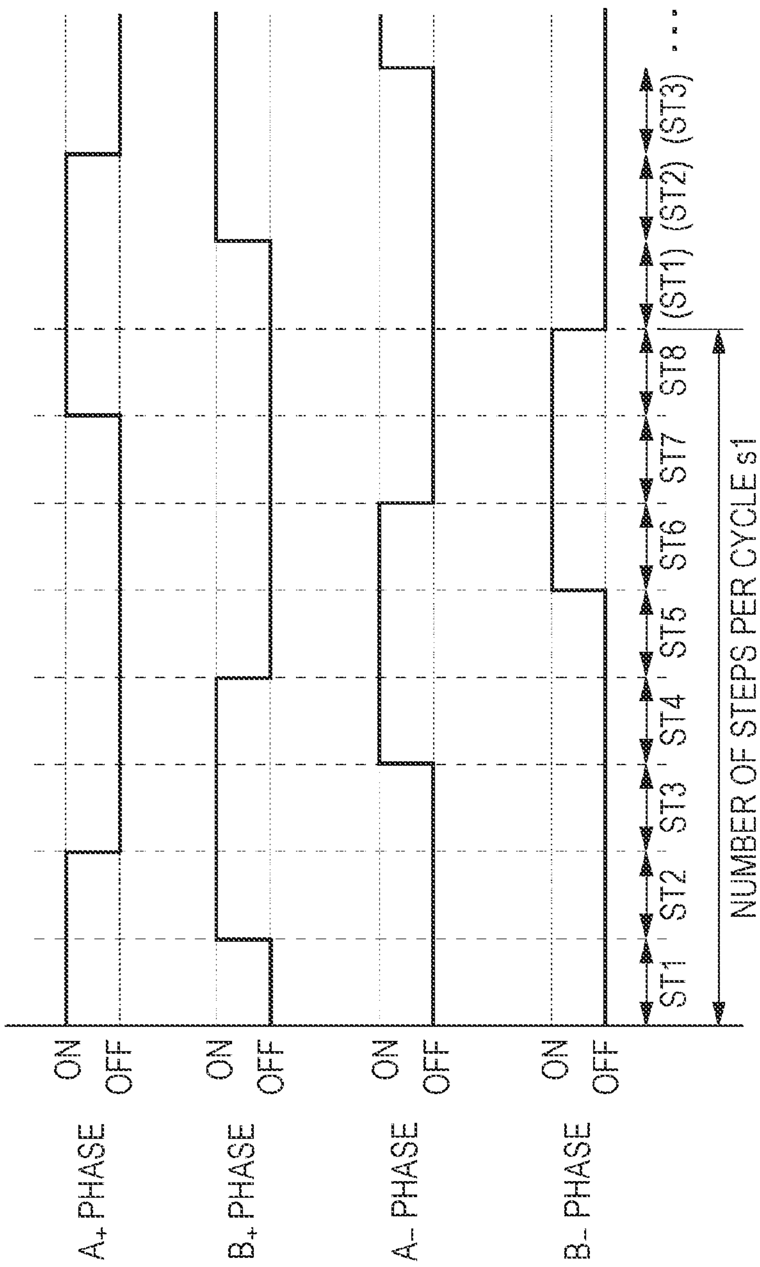
FIG. 12 illustrates the turning on and off of energization to each lead for each step when the electromagnets of the stacker exit motor according to the first exemplary embodiment are excited using the one-two phase excitation method.

FIG. 12 illustrates the turning on and off of energization to each lead for each step when the electromagnets 141 to 148 of the stacker exit motor MA2 according to the first exemplary embodiment are excited using a one-two phase excitation method.

Figure 13:
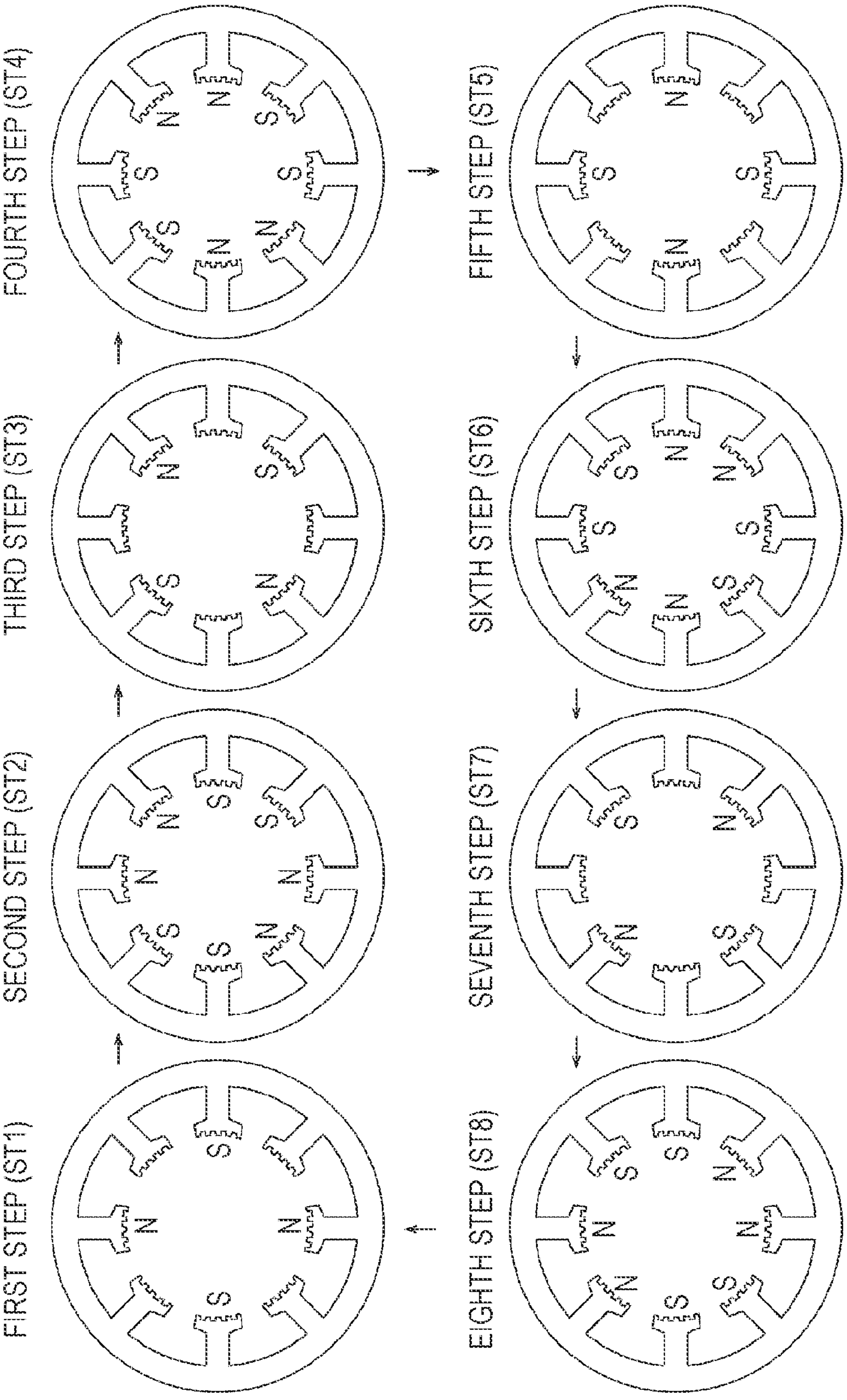
FIG. 13 illustrates changes in the states of the magnetic poles in the respective steps illustrated in FIG. 12.

FIG. 13 illustrates changes in the states of the magnetic poles in the respective steps illustrated in FIG. 12.

In a one-two phase excitation method in which the leads 151, 152, 161, and 162 are periodically energized in the order of only the $A_+$ phase lead 151, a set of the $A_+$ phase lead 151 and the $B_+$ phase lead 161, only the $B_+$ phase lead 161, a set of the $B_+$ phase lead 161 and the $A\_$ phase lead 152, only the $A\_$ phase lead 152, a set of the $A\_$ phase lead 152 and the $B\_$ phase lead 162, only the $B\_$ phase lead 162, and a set of the $B\_$ phase lead 162 and the $A_+$ phase lead 151, the shaft 108 rotates by a ⅛ pitch in the rotation direction for each pulse.

That is, as illustrated in FIGS. 12 and 13, the shaft 108 rotates by a ⅛ pitch while the number of magnetic poles of each type is alternately changed to two and four in eight steps ST1 to ST8 for the individual pulses and while each magnetic pole is shifted by 45° in the rotation direction by two steps.

In the first exemplary embodiment, a controller of the post-processing device U3 is predetermined so as to control the driving of the stacker exit motor MA2 using the one-two phase excitation method so that the shaft 108 rotates by a ⅛ pitch in the rotation direction.

In the first exemplary embodiment, therefore, the number of steps s1 per cycle representing the number of steps required for a change in magnetic pole to complete one cycle is preset to 8, and the rotation angle θ1 of the shaft 108 per step is preset to 0.9°. That is, a cycle angle θs, which is an angle obtained by multiplying the rotation angle θ1 by the number of steps s1 per cycle, is preset to $\theta s=\theta 1\times s1=0.9\times 8=7.2°$.

In the first exemplary embodiment, furthermore, the total number p1 of pulses required for one rotation of the shaft 108 is preset to $p1=360/\theta 1=360/0.9=400$ [step/rotation], and the number of divisions d1 obtained by dividing one rotation of the shaft 108 by the cycle angle θs is preset to d1=360/θs=360/7.2=50 [8 steps/rotation].

In the first exemplary embodiment, furthermore, a drive frequency f1, which may be an example of a first frequency that represents the number of pulse signals input to the stacker exit motor MA2 per unit time, is preset to 2424 pps. Therefore, the number of rotations r1 per unit time that is a value obtained by dividing the drive frequency f1 by the total number p1 is preset to r1=f1/p1=2424/400=6.06 rotations/sec (Hz).

Further, if a meshing frequency f2 of the pinion gear 109, which may be an example of a second frequency, is a value obtained by multiplying the number of rotations r1 per unit time by the number of teeth g1 of the pinion gear 109, the meshing frequency f2 is preset to f2=r1×g1=6.06×23=139.38≈139 Hz. In addition, if an excitation fundamental frequency f3 of the stacker exit motor MA2, which may be an example of a third frequency, is a value obtained by dividing the drive frequency f1 by the number of steps s1 per cycle, the excitation fundamental frequency f3 is preset to f3=f1/s1=2424/8=303 Hz.

In the first exemplary embodiment, therefore, the least common multiple f23 of the meshing frequency f2 and the excitation fundamental frequency f3 is equal to f23=LCM(f2, f3)=f2×f3≈139×303=41978 Hz, and, as an example, a threshold value fs is preset to greatly exceed 4000 Hz, which is the threshold of hearing in the audible frequency range audible to the human ear.

In the first exemplary embodiment, furthermore, the natural frequencies fa, fb, and fc of the timing belt 113, the motor bracket 111, and the rear frame 101 are predetermined so that the least common multiples f2*a*, f2*b*, and f2*c* of the natural frequencies fa, fb, and fc and the meshing frequency f2, respectively, or the least common multiples f3*a*, f3*b*, and f3*c* of the natural frequencies fa, fb, and fc and the excitation fundamental frequency f3, respectively, exceed the threshold value fs. For example, if the natural frequencies fa, fb, and fc are set to fa=151 Hz, fb=401 Hz, and fc=503 Hz, respectively, which may be examples of a prime frequency having a value different from the frequencies f2 and f3, it may be possible to set the least common multiples f2*a* to f2*c* and f3*a* to f3*c* to exceed the threshold value fs.

The tamper drive motors 98 and the tamper drive gears 99 according to the first exemplary embodiment may also be configured in a manner similar to the stacker exit motor MA2 and the pinion gear 109, and the following settings are preset: g1=23 teeth, s1=8 steps, θ1=0.9°, θs=7.2°, p1=400 [step/rotation], d1=50 [8 steps/rotation], f1=2424 pps, r1=6.06 rotations/sec, f2≈139 Hz, f3=303 Hz, and f23=41978 Hz.

Similarly to the natural frequencies fa and fb, the natural frequencies of the guided rod 94 having the tamper rack teeth 97, the tamper body 93, the compile tray body 7, and the brackets and support members of the tamper drive motors 98 are also preset to a divisor of the least common multiple f23.

Operation of First Exemplary Embodiment

In the printer U according to the first exemplary embodiment having the above configuration, the controller of the post-processing device U3 controls the stacker exit motor MA2, which may be formed of a stepping motor, so that the stacker exit roller 16 is rotated in the forward and reverse directions through the drive transmission systems 101 to 113. When the stacker exit roller 16 is rotated in the forward direction, the trailing ends of sheets S are caused to abut against the end wall 8 so that the sheets S are aligned with one another. When the stacker exit roller 16 is rotated in the reverse direction, the sheets S on the compile tray 6 are output onto the stacker tray TH1. The stacker exit motor MA2 according to the first exemplary embodiment may be formed of, as with the configuration disclosed in Japanese Unexamined Patent Application Publication No. 2000-310893 (Abstract, paragraphs [0023] to [0037], FIGS. 1 to 6), a two-phase HB stepping motor using the one-two phase excitation method, and noise generated from the stepping motor may be reduced.

As described in Japanese Unexamined Patent Application Publication No. 05-127441 (paragraphs [0011] to [0016], FIGS. 2 to 4), Japanese Unexamined Patent Application Publication No. 05-323684 (paragraphs [0002], [0029], and [0030], FIG. 4), Japanese Unexamined Patent Application Publication No. 2000-310893 (Abstract, paragraphs [0023] to [0037], FIGS. 1 to 6), etc., when the stepping motor is driven, vibration of the stepping motor resonates through the bracket, the frame, and the drive transmission systems depending on conditions such as the total number of pulses per second, that is, the drive frequency f1 of the stepping motor, and the natural frequencies fa to fc of the bracket, the frame, and the drive transmission systems, and noise may be generated. The human ear is particularly sensitive to noise of high frequencies from 1 kHz to 4 kHz, and such noise may be perceived as noise that is uncomfortable for users.

Figure 14:
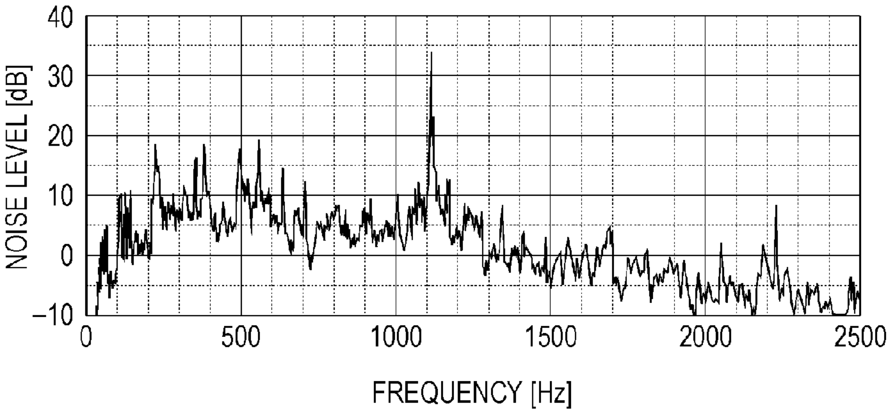
FIG. 14 RELATED ART
FIG. 14 is a graph illustrating results obtained by the frequency analysis of noise generated by driving a stepping motor in a conventional printer, with noise level in decibels (dB) plotted on the y axis and frequency in hertz (Hz) plotted on the x axis.

FIG. 14 is a graph illustrating results obtained by the frequency analysis of noise generated by driving a stepping motor in a conventional printer, and noise levels are represented in frequencies, with noise level in decibels (dB) plotted on the y axis and frequency in hertz (Hz) plotted on the x axis.

In an example of the conventional printer, a two-phase HB stepping motor may have a drive frequency f1 of 2230 Hz and may be driven using the one-two phase excitation method, and the pinion gear may have 25 teeth, which is most commonly used, as the number of teeth g1. In this case, the frequency analysis of noise generated from the printer shows that, as illustrated in FIG. 14, a noise level pn is especially as high as approximately 34 dB at a frequency of 1115 Hz, which may cause noise that is uncomfortable for users.

A peak frequency fn of 1115 Hz, which is a frequency at which the generated noise level pn exhibits a peak, and a drive frequency f1 of 2230 Hz have a relationship of fn:f1=1:2, and it is considered that there is a close relationship between the peak frequency fn of noise and the drive frequency f1.

If the center of the rotating shaft of the stepping motor is eccentric from an actual center of rotation due to individual differences in manufacturing error, assembling error, or the like, a periodic oscillation occurs in accordance with the rotation of the rotating shaft, and the entire stepping motor may vibrate.

Vibration of the rotating shaft may be caused not only by eccentricity between the center of the bearing and the center of the rotating shaft but also by, for example, a change in the orientation and magnitude of the magnetic force which may be caused by a change in the number of magnetic poles based on the resonant frequency of a rotor, individual differences between cores or coils of electromagnets, and excitation pattern of one-two phase excitation.

Since the rotation of the stepping motor is basically based on small repetitions of operations of "starting" and "stopping", the rotor may vibrate or pulsation of magnetic force may weaken the rigidity of the teeth of the stator and may cause the stator to vibrate. In this case, due to variation in the magnetic force or position in the respective excitation patterns, a vibration occurs in accordance with the period of the excitation patterns, and the waveform of the vibration of the entire stepping motor has a period corresponding to the time period required for one cycle of using the excitation patterns once. The frequency of a fundamental wave component of vibration based on the excitation patterns is considered to depend on a value obtained by dividing the drive frequency f1 by the number of steps s1 per cycle, and is defined herein as the excitation fundamental frequency f3. Thus, the excitation fundamental frequency f3 of a two-phase HB stepping motor based on the one-two phase excitation method is given by f3=f1/s1=2230/8=278.75 Hz.

The vibration of the rotating shaft may also be caused when the teeth of the pinion gear supported by the rotating shaft mesh with the teeth of gears and the like of the drive transmission systems, due to variation of depth of mesh, time during which the teeth mesh with each other, etc., depending on individual differences in teeth shapes etc. In this case, the waveform of the vibration described above has a period corresponding to the time period during which the pinion gear rotates one turn, that is, the time period during which the rotating shaft rotates one turn. Therefore, the frequency of a fundamental wave component of vibration based on mesh patterns is considered to depend on a value obtained by multiplying the number of teeth g1 of the pinion gear and the number of rotations r1 of the rotating shaft per second, and is defined herein as the meshing frequency f2. Thus, the meshing frequency f2 of a two-phase HB stepping motor based on the one-two phase excitation method is given by f2=g1×r1=25×(2230/400)=25×5.575=139.375 Hz.

Accordingly, there is a relationship of fn:f3:f2=1115:278.75:139.375=8:2:1 between the noise peak frequency fn=1115 Hz, the excitation fundamental frequency f3=278.75 Hz, and the meshing frequency f2=139.375 Hz. That is, in a two-phase HB stepping motor based on the one-two phase excitation method, the relationship fn=4×f3=8×f2 is established, and the frequency (4×f3) of a fourth harmonic component of vibration having a frequency equal to the excitation fundamental frequency f3 or the frequency (8×f2) of an eighth harmonic component of vibration having a frequency equal to the meshing frequency f2 matches the peak frequency fn of noise.

Consequently, in the conventional printer, the noise is considered to have a high noise level pn because superimposition of a fourth harmonic component of vibration having a frequency equal to the excitation fundamental frequency f3 and an eighth harmonic component of vibration having a frequency equal to the meshing frequency f2 resonates through the bracket, the gear, the timing belt, etc. That is, the peak frequency fn of the noise may be any of resonant frequencies fa' to fc' having values that are integer multiples α, β, and γ of the natural frequencies fa to fc of the bracket, etc., that is, fa'=α×fa [Hz], fb'=β×fb [Hz], and fc'=γ×fc [Hz].

In contrast, the stacker exit motor MA2 according to the first exemplary embodiment has a relationship of f2:f3=139.375:303≈139:303 between the meshing frequency f2 and the excitation fundamental frequency f3. In addition, for the least common multiple f23 of the meshing frequency f2 and the excitation fundamental frequency f3, the relationship f23=f2×f3 is established, and the least common multiple f23 is set to exceed the threshold value fs=4 [kHz], which may be perceived as uncomfortable noise.

In the first exemplary embodiment, therefore, even if the timing belt 113, the motor bracket 111, the rear frame 101, etc., resonate in accordance with the resonance of the n-th harmonic component of vibration having a frequency equal to the excitation fundamental frequency f3 and the m-th harmonic component of vibration having a frequency equal to the meshing frequency f2, where n and m are natural numbers, the relationship fn=n×f3=m×f2 is established, where fn>fs. The resonant frequencies fa' to fc', which may become the peak frequency fn, exceed the threshold value fs, and the noise level pn of the frequency band to which the human ear is less sensitive becomes high.

In the printer U according to the first exemplary embodiment, the peak frequency fn at which superimposition of harmonic components of vibration having frequencies equal to the frequencies f2 and f3 increases the noise level pn exceeds the threshold value fs. Therefore, it may be difficult for users to hear sound having the peak frequency fn.

As a result, the printer U according to the first exemplary embodiment may reduce noise that is uncomfortable for users, compared to the configuration in which the least common multiple f23, which becomes equal to the peak frequency fn, does not exceed the threshold value fs.

In addition, for example, even if 8×139.375=1115 is established and an eighth harmonic component of vibration having a frequency equal to the meshing frequency f2 has a frequency equal to the resonant frequency of 1115 Hz of the bracket etc., an n-th harmonic component of vibration having a frequency equal to the excitation fundamental frequency f3 does not have a frequency of 1115 Hz. Therefore, the printer U according to the first exemplary embodiment may prevent the motor bracket 111 etc., from resonating in accordance with resonance of harmonic components of vibration having frequencies equal to the frequencies f2 and f3. As a result, the printer U according to the first exemplary embodiment may reduce an increase in the noise level of high frequencies to which the human ear is more sensitive, compared to the configuration in which the least common multiple f23, which becomes equal to the peak frequency fn, does not exceed the threshold value fs.

Experimental Example

Figure 15:
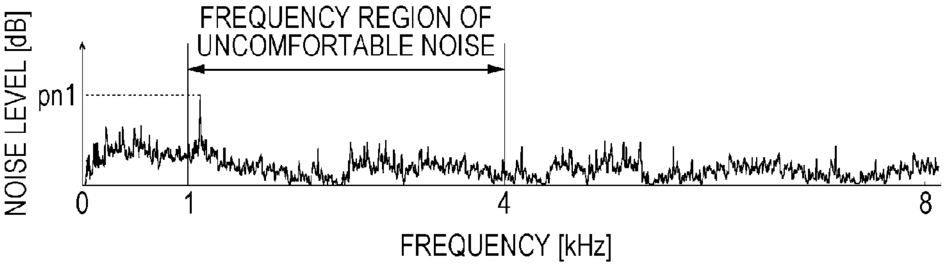
FIG. 15 illustrates peak levels measured in an experimental example.

FIG. 15 illustrates peak levels measured in an experimental example.

Following experiments are performed in order to determine whether or not it is possible to reduce noise of the stacker exit motor MA2 when the least common multiple f23, which becomes equal to the peak frequency fn, exceeds the threshold value fs.

Experimental Conditions

In the experimental examples, a configuration in which an n-th harmonic component (n×f2) of vibration having a frequency equal to the meshing frequency f2 causes the bracket etc., to resonate at a frequency less than or equal to the threshold value fs is used to measure the noise levels pn (in dB) of the printer U in a case where the least common multiple f23 exceeds the threshold value fs and in a case where the least common multiple f23 is less than or equal to the threshold value fs.

Specifically, a noise level pn at each frequency is measured as illustrated in FIG. 15 in a case where f23=f2×f3>fs is obtained by adjusting the number of teeth g1 and the drive frequency f1 and in a case where f23=f3=2×f2≤fs is obtained by adjusting the number of teeth g1 and the drive frequency f1, and a peak level pn1 that is a local maximum among the noise levels pn obtained in a range from 1 kHz to 4 kHz both inclusive is detected.

Experimental Example 1

In Experimental Example 1, the drive frequency f1 (in pps (Hz)) is adjusted so that the meshing frequency f2 becomes equal to 139.375 Hz when the number of teeth g1 of the pinion gear 109 is 27, 26, and 24 to 22, and the peak level pn1 obtained when f23=f2×f3>fs is established is detected.

In Experimental Example 1-1, a peak level pn1 is detected under the conditions of g1=27 teeth and f1=2065 pps. In this case, the relationships f2=139.3875 Hz, f3=258.125 Hz, and f3≠2×f2 are established, where f23>fs.

In Experimental Example 1-2, a peak level pn1 is detected under the conditions of g1=26 teeth and f1=2144 pps. In this case, the relationships f2=139.36 Hz, and f3=268 Hz, f3≠2×f2 are established, where f23>fs.

In Experimental Example 1-3, a peak level pn1 is detected under the conditions of g1=24 teeth and f1=2323 pps. In this case, the relationships f2=139.38 Hz, f3=290.375 Hz, and f3≠2×f2 are established, where f23>fs.

In Experimental Example 1-4, a peak level pn1 is detected under the conditions of g1=23 teeth and f1=2424 pps. In this case, the relationships f2=139.38 Hz, f3=303 Hz, and f3≠2×f2 are established, where f23>fs.

In Experimental Example 1-5, a peak level pn1 is detected under the conditions of g1=22 teeth and f1=2534 pps. In this case, the relationships f2=139.37 Hz, f3=316.75 Hz, and f3≠2×f2 are established, where f23>fs.

Comparative Example 1

In Comparative Example 1, a peak level pn1 is detected when the stacker exit motor MA2 is driven at the drive frequencies f1 given in Experimental Examples 1-1 to 1-5 under conditions where the number of teeth g1 of the pinion gear 109 is 25 and the relationship f3=2×f2≤fs is always established.

In Comparative Example 1-1 corresponding to Experimental Example 1-1, a peak level pn1 is detected under the conditions of g1=25 teeth and f1=2065 pps. In this case, the relationships f2=129.0625 Hz and f3=2×f2≤fs are established.

In Comparative Example 1-2 corresponding to Experimental Example 1-2, a peak level pn1 is detected under the conditions of g1=25 teeth and f1=2144 pps. In this case, the relationships f2=134 Hz and f3=2×f2≤fs are established.

In Comparative Example 1-3 corresponding to Experimental Example 1-3, a peak level pn1 is detected under the conditions of g1=25 teeth and f1=2323 pps. In this case, the relationships f2=145.1875 Hz and f3=2×f2≤fs are established.

In Comparative Example 1-4 corresponding to Experimental Example 1-4, a peak level pn1 is detected under the conditions of g1=25 teeth and f1=2424 pps. In this case, the relationships f2=151.5 Hz and f3=2×f2≤fs are established.

In Comparative Example 1-5 corresponding to Experimental Example 1-5, a peak level pn1 is detected under the conditions of g1=25 teeth and f1=2534 pps. In this case, the relationships f2=158.375 Hz and f3=2×f2≤fs are established.

Comparative Example 2

In Comparative Example 2, a peak level pn1 is detected under the conditions of g1=25 teeth and f1=2230 pps. In this case, the relationships f2=139.375 Hz, f3=278.75 Hz, and f23=f3=2×f2≤fs are established.

Experimental Results

Figure 16:
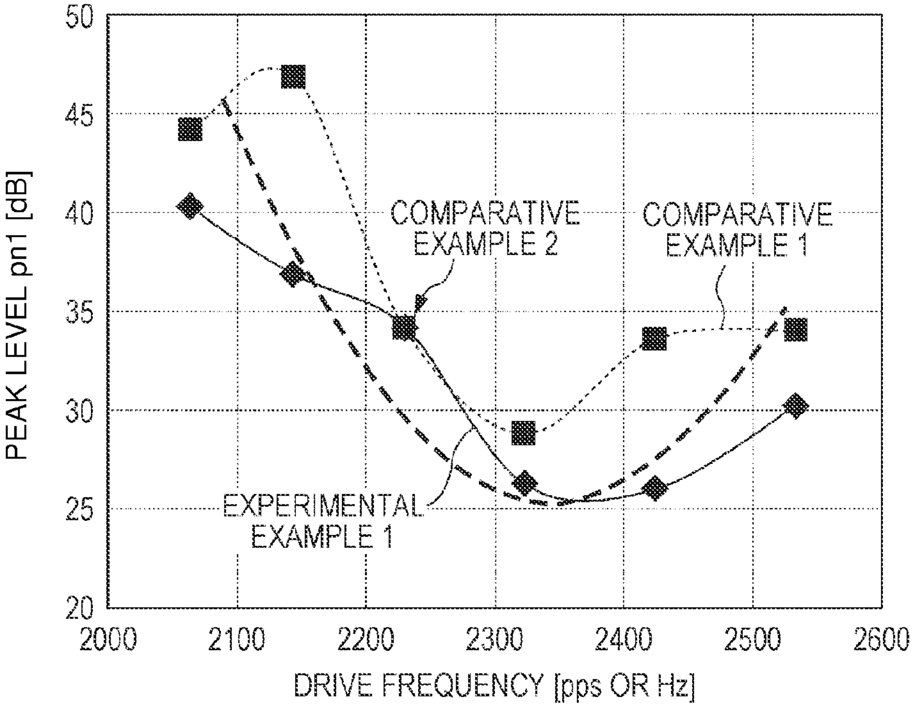
FIG. 16 is a graph illustrating the operation of the first exemplary embodiment, and illustrates a relationship between peak levels obtained in Experimental Example 1 and Comparative Examples 1 and 2, with peak level in decibels (dB) plotted on the y axis and drive frequency in pulses per second (pps) (i.e., in hertz (Hz)) plotted on the x axis.

FIG. 16 is a graph illustrating the operation of the first exemplary embodiment, and illustrates a relationship between peak levels obtained in Experimental Example 1 and Comparative Examples 1 and 2, with peak level in dB plotted on the y axis and drive frequency in pps (Hz) plotted on the x axis.

The results are as follows: As indicated by a solid line in FIG. 16, peak levels pn1 detected in Experimental Example 1 are approximately 41 dB for Experimental Example 1-1, approximately 37 dB for Experimental Example 1-2, approximately 26 dB for Experimental Example 1-3, approximately 26 dB for Experimental Example 1-4, and approximately 30 dB for Experimental Example 1-5. Further, as indicated by a dotted line in FIG. 16, peak levels pn1 detected in Comparative Example 1 are approximately 44 dB for Comparative Example 1-1, approximately 48 dB for Comparative Example 1-2, approximately 28 dB for Comparative Example 1-3, approximately 33 dB for Comparative Example 1-4, and approximately 34 dB for Comparative Example 1-5, and a peak level pn1 detected in Comparative Example 2 is approximately 34 dB.

Therefore, it is found that the peak levels pn1 obtained in Experimental Examples 1-1, 1-2, 1-3, 1-4, and 1-5 are reduced by approximately 3 dB, approximately 11 dB, approximately 2 dB, approximately 7 dB, and approximately 4 dB with respect to those obtained in Comparative Examples 1-1, 1-2, 1-3, 1-4, and 1-5, respectively.

Thus, it is found that Experimental Example 1 in which the least common multiple f23 exceeds the threshold value fs exhibits a reduction of the peak levels pn1 at the respective drive frequencies f1, compared to those in Comparative Example 1 in which the least common multiple f23 is less than or equal to the threshold value fs.

Consequently, the printer U according to the first exemplary embodiment may reduce the peak level pn1 of uncomfortable noise generated by the stacker exit motor MA2, compared to a configuration in which the least common multiple f23 is less than or equal to the threshold value fs.

Here, an approximation function F(g1, f1) indicated by a broken line in FIG. 16 may be set for the peak levels pn1 in Experimental Example 1. That is, if the meshing frequency f2 corresponding to the number of teeth g1 of the pinion gear 109 and the drive frequency f1 has been predetermined, the approximation function F(g1, f1) of a peak level pn1 for which the relationship pn1=F(g1, f1) is established may be set. The approximation function F(g1, f1) may be considered to be the transfer function of vibration of the drive transmission systems that is set in accordance with relationships such as the relationships between the excitation fundamental frequency f3 and the resonant frequencies fa' to fc' of the bracket etc.

In the printer U according to the first exemplary embodiment, therefore, if a meshing frequency f2 has been predetermined, an approximation function F(g1, f1) may be set on the basis of the results of the experiment, and the number of teeth g1 of the pinion gear 109 that minimizes the peak level pn1 may be set.

If, in printer design, an integer multiple of the number of teeth g1 of the pinion gear 109 is equal to the total number p1 of pulses [step/rotation] required for one rotation of the stepping motor, that is, if the total number p1 is divisible by the number of teeth g1, the designer may easily control positioning of the pinion gear.

In commercially available stepping motors, the total number p1 of pulses required for one rotation is generally a multiple of 5 in order to make it easy for the designer to calculate the number of pulses corresponding to the desired number of rotations. For example, in a standard two-phase stepping motor similar to the two-phase stepping motor according to the first exemplary embodiment, p1=400 [8 steps/rotation]

for one-two phase excitation, and p1=200 [8 steps/rotation] for one-phase excitation or two-phase excitation.

For this reason, in many cases, the number of teeth g1 of the pinion gear 109 mounted in the stepping motor is generally 10, 20, 25, or the like by which the total number p1, namely, 400 or 200, is divisible.

Thus, conventional printers, such as those disclosed in Japanese Unexamined Patent Application Publication No. 05-127441 (paragraphs [0011] to [0016], FIGS. 2 to 4), Japanese Unexamined Patent Application Publication No. 05-323684 (paragraphs [0002], [0029], and [0030], FIG. 4), and Japanese Unexamined Patent Application Publication No. 2000-310893 (Abstract, paragraphs [0023] to [0037], FIGS. 1 to 6), generally include, in combination, a two-phase stepping motor and a pinion gear having 25 teeth, which are the most widely distributed and commonly used among commercially available stepping motors and pinion gears. A pinion gear having 25 teeth may provide easier calculation of positioning than pinion gears having 21 to 24 teeth or pinion gears having 26 to 29 teeth.

In this case, in addition to the total number p1 of pulses per rotation, the number of divisions d1 per number of steps s1 per cycle of excitation patterns is also divisible by the number of teeth g1. That is, for the number of divisions d1, the relationship d1=50 [8 steps/rotation] is established for one-two phase excitation, and the relationship d1=25 [8 steps/rotation] is established for one-phase excitation or two-phase excitation. Each of the number of teeth g1 and the number of divisions d1 is a multiple of 25, and the number of divisions d1 is divisible by the number of teeth g1.

Here, the meshing frequency f2 and the excitation fundamental frequency f3 are represented by the following equations (1) and (2), respectively, using the respective values representing the number of teeth g1 of the pinion gear 109, the drive frequency f1 of the stepping motor, the number of steps s1 per cycle, and the number of divisions d1.

$$f2=g1\times f1/(s1\times d1) \qquad \text{Equation (1)}$$

$$f3=f1/s1 \qquad \text{Equation (2)}$$

Therefore, f3/f2 may be represented using the following equation (3).

$$f3/f2=(f1/s1)/\{g1\times f1/(s1\times d1)\}=d1/g1 \qquad \text{Equation (3)}$$

Therefore, if the number of divisions d1 is divisible by the number of teeth g1, that is, if the number of teeth g1 is a divisor of the number of divisions d1, as in Comparative Examples 1 and 2, the least common multiple f23 becomes equal to the excitation fundamental frequency f3. In addition, if the number of teeth g1 is divisible by the number of divisions d1, that is, if the number of divisions d1 is a divisor of the number of teeth g1, the least common multiple f23 becomes equal to the meshing frequency f2. Thus, if the frequencies f2 and f3, which become equal to the least common multiple f23, do not exceed 4 kHz, the peak level pn1 may increase due to vibration of the frequencies f2 and f3.

In order to make the frequencies f2 and f3, which become equal to the least common multiple f23, exceed 4 kHz, it may be required to satisfy f1>16000 if, for example, the one-phase excitation method is used and the number of steps s1 per cycle is 4. In this case, the drive frequency f1 may be too high, and a torque for transmitting a driving force to a drive receiving member may be insufficient, resulting in a loss of synchronization being likely to occur. In addition, an expensive motor may have to be used. It is therefore difficult in practice to make the frequencies f2 and f3, which become equal to the least common multiple f23, higher than 4 kHz by increasing the drive frequency f1.

Consequently, in a conventional printer in which each of the number of teeth g1 and the number of divisions d1 is a multiple of 25, the least common multiple f23 is likely to be equal to an excitation fundamental frequency f3 less than or equal to 4 kHz, and the peak level pn1 is likely to become high due to vibration of the frequencies f2 and f3.

In the first exemplary embodiment, in contrast, the pinion gear 109 has teeth, the number g1 of which is not 25, by which the value representing the number of divisions d1, namely, 50 [8 steps/rotation], is not divisible.

Consequently, the printer U according to the first exemplary embodiment may reduce the peak level pn1 of uncomfortable noise, compared to a configuration in which the number of divisions d1 of the rotating shaft is an integer multiple of the number of teeth g1 and in which the least common multiple f23 is less than or equal to the threshold value fs.

In the first exemplary embodiment, furthermore, the combination of the number of teeth g1 being 23 [teeth] and the drive frequency f1 being 2424 [pps], which is expected to minimize the peak level pn1, is set from the approximation function F(g1, f1) corresponding to the predetermined meshing frequency f2.

Therefore, the printer U according to the first exemplary embodiment may reduce the peak level pn1 of uncomfortable noise, compared to a configuration in which the combination of the number of teeth g1 and the drive frequency f1 is not set from the approximation function F(g1, f1).

In the printer U according to the first exemplary embodiment having the above configuration, furthermore, the natural frequencies fa to fc of the timing belt 113 etc. are set to prime numbers different from the meshing frequency f2 or the excitation fundamental frequency f3, and the least common multiples f2*a* to f2*c* and f3*a* to f3*c* of the natural frequencies fa to fc and the frequencies f2 and f3 are set to values that exceed the threshold value fs. Thus, in the first exemplary embodiment, the resonant frequencies fa' to fc' that are integer multiples of the natural frequencies fa to fc and that are less than or equal to 4 kHz are set to be different from the frequencies f2 and f3 of a fundamental wave component of vibration of the stacker exit motor MA2 or the frequencies (2×f2, 3×f2, . . . ) and (2×f3, 3×f3, . . . ) of second and higher harmonic components.

Consequently, in the printer U according to the first exemplary embodiment, the timing belt 113 etc. may be prevented from resonating due to the vibration having the frequencies f2 and f3, and the peak level pn1 of uncomfortable noise may be reduced, compared to a configuration in which the least common multiples f2*a* to f2*c* and f3*a* to f3*c* are less than or equal to the threshold value fs.

In the printer U according to the first exemplary embodiment, furthermore, the drive transmission systems (7+93 to 99) of the tamper drive motors 98 may also achieve operation and effect similar to those of the drive transmission systems 101 to 113 of the stacker exit motor MA2.

Modifications

While an exemplary embodiment of the present invention has been described in detail, the present invention is not limited to the foregoing exemplary embodiment, and a variety of modifications may be made within the scope of the present invention defined in the appended claims. First to seventh modifications of the present invention are disclosed for the purpose of illustration.

First Modification

In the foregoing exemplary embodiment, the printer U is used as an example of an image forming apparatus for the purpose illustration. Any other image forming apparatus such as a copier, a facsimile (fax) machine, or a multifunction peripheral having plural functions of such devices may also be used.

Second Modification

In the foregoing exemplary embodiment, a configuration according to an exemplary embodiment of the present invention is applied to the drive transmission systems (7+93 to 99, 101 to 113) of the stacker exit motor MA2 and the tamper drive motors 98 in the post-processing device U3. Alternatively, for example, if the other motors of the post-processing device U3, namely, the roller drive motor MA1, the shelf drive motor MA3, and the paddle drive motor MA6, and the stapler moving motor 74 are implemented by stepping motors, a configuration according to an exemplary embodiment of the present invention may also be applied to the drive transmission systems of the motors MA1 to MA6 and 74. In addition, for example, if the main motor of the printer body U1 is implemented by a stepping motor, a configuration according to an exemplary embodiment of the present invention may also be applied to the drive transmission system of the main motor.

Third Modification

In the foregoing exemplary embodiment, the stacker exit motor MA2 and the tamper drive motors 98 are implemented by a two-phase HB motor. The type of motor is not limited to the HB type, and any other type of motor such as a permanent magnet (PM) motor or a gear-shaped iron core motor serving as a variable reluctance (VR) motor may also be used. In addition, the number of phases is not limited to two, and a motor having any other number of phases, such as a three-phase motor or a five-phase motor, may also be used.

Fourth Modification

As in the first exemplary embodiment, it may be desirable that each of the stacker exit motor MA2 and the tamper drive motors 98 be a unipolar stepping motor of the type in which current flows through two coils in one direction. However, the present invention is not limited to this exemplary embodiment, and a bipolar stepping motor of the type in which current flows through one coil in two directions may also be used in order to add a function for short-circuit current prevention or reduction, although the complexity of the structure of a driving device may increase.

Fifth Modification

As in the foregoing exemplary embodiment, it may be desirable that the electromagnets 141 to 148 be excited using the one-two phase excitation method in order to reduce noise generated by the stacker exit motor MA2 and the tamper drive motors 98. However, the present invention is not limited to this exemplary embodiment, and the electromagnets 141 to 148 may also be excited using the one-phase excitation method or the two-phase excitation method. If the one-phase excitation method or the two-phase excitation method is used instead, the number of steps s1 per cycle becomes (½) times that described above, and the meshing frequency f2 and the excitation fundamental frequency f3 become two times those described above. In this case, if one of the number of teeth g1 and the number of divisions d1 is divisible by the other, for example, if d1=g1=25, the least common multiple f23 does not change and is less than or equal to the threshold value fs, whereas, if one of the number of teeth g1 and the number of divisions d1 is not divisible by the other, for example, if d1=25 and g1=23, the least common multiple f23 becomes two times that described above, and thus more easily exceeds the threshold value fs.

Sixth Modification

In the foregoing exemplary embodiment, the vibration absorbing member 112 is supported between the rear frame 101 and the motor bracket 111. Alternatively, for example, a member composed of urethane or a similar material, which is similar to the vibration absorbing member 112, may also be disposed between the stacker exit motor MA2 and the motor bracket 111 so that vibration of the stacker exit motor MA2 may be absorbed through elastic deformation to reduce vibration of the motor bracket 111.

Seventh Modification

The specific values in the foregoing exemplary embodiment (g1=23, s1=8, d1=50, f1=2424, p1=400, r1=6.06, f2≈139, f3=303, f23≈41978, fs=4000, fa=151, fb=401, fc=503, etc.) are not limited to the illustrated values, and may be changed as desired within a range without departing from the scope of the invention claimed herein.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A drive transmission system comprising:

a drive source including a rotating shaft, a magnet supported by the rotating shaft, and a plurality of electromagnets that are arranged in a circumferential direction of the rotating shaft and that surround the magnet, the drive source being configured to drive the rotating shaft to rotate by a predetermined rotation angle by exciting at least one of the plurality of electromagnets in accordance with an input of an input signal and by periodically changing a magnetic pole to which each of the plurality of electromagnets is excited in response to an input of the input signal; and a gear supported by the rotating shaft, wherein the least common multiple of a second frequency and a third frequency exceeds a threshold value that is a predetermined value based on an audible frequency range audible to the human ear, the second frequency being a value obtained by multiplying a number of rotations of the drive source per unit time by a number of teeth of the gear, the number of rotations of the drive source per unit time being a value obtained by dividing a first frequency by a total number of input signals required for the rotating shaft to rotate one turn, the first frequency being a value representing the number of input signals input to the drive source per unit time, the third frequency being a value obtained by dividing the first frequency by a number of steps per cycle, the number of steps per cycle being a total number of input signals required for the periodically changing of the magnetic pole to complete one cycle.

2. The drive transmission system according to claim 1, wherein the gear has a predetermined number of teeth, and if each of the second frequency and the third frequency is less than or equal to the threshold value, one of the number of teeth of the gear and a number of divisions is not different from a divisor of the other, the number of divisions being a value obtained by dividing one rotation of the rotating shaft by a cycle angle, the cycle angle being an angle obtained by multiplying the rotation angle by the number of steps per cycle.

3. A post-processing device comprising:

a transport member that transports a medium output from an image forming apparatus body that forms an image on the medium; and the drive transmission system according to claim 1, the drive transmission system driving the transport member to rotate.

4. An image forming apparatus comprising:

an image forming apparatus body that forms an image on a medium; and the post-processing device according to claim 3, the post-processing device performing post-processing on the medium output from the image forming apparatus body.

5. An image forming apparatus comprising:

an image recording unit that records an image on a medium;

a transport member that transports a medium to the image recording unit; and the drive transmission system according to claim 1, the drive transmission system driving the transport member to rotate.

* * * * *